US008001838B2

(12) United States Patent  
Roberts

(10) Patent No.: US 8,001,838 B2  
(45) Date of Patent: Aug. 23, 2011

(54) ELECTRONIC PITCHING TRAINER AND METHOD FOR DETERMINING THE TRUE SPEED OF A SPORTS PROJECTILE

(76) Inventor: Jerry B. Roberts, Arlington, MA (US)

( * ) Notice: Subject to any disclaimer, the term of this patent is extended or adjusted under 35 U.S.C. 154(b) by 271 days.

(21) Appl. No.: 12/186,130

(22) Filed: Aug. 5, 2008

(65) Prior Publication Data

US 2009/0298622 A1    Dec. 3, 2009

Related U.S. Application Data

(60) Provisional application No. 60/963,793, filed on Aug. 7, 2007.

(51) Int. Cl.  
*G01P 15/00* (2006.01)  
*A63B 69/00* (2006.01)

(52) U.S. Cl. ............................. 73/488; 473/455

(58) Field of Classification Search .................... 73/488; 473/439, 454–456, 462, 476  
See application file for complete search history.

(56) References Cited

U.S. PATENT DOCUMENTS

| | | | | |
|---|---|---|---|---|
| 5,820,496 A | * | 10/1998 | Bergeron | 473/455 |
| 6,272,071 B1 | | 8/2001 | Takai et al. | 367/90 |
| 6,551,205 B1 | | 4/2003 | Koelzer, Jr. et al. | 473/454 |
| 6,614,719 B1 | | 9/2003 | Grzesek | 367/90 |
| 2005/0187036 A1 | | 8/2005 | Ziola et al. | 473/372 |

* cited by examiner

*Primary Examiner* — Hezron E Williams  
*Assistant Examiner* — Tamiko Bellamy  
(74) *Attorney, Agent, or Firm* — Robert Plotkin, P.C.

(57) ABSTRACT

A sensing device obtains range-related data—such as Doppler data or pulse time-of-flight data—from a sports projectile during flight. The time course of the range-related data is employed, in light of predictable characteristics of the projectile trajectory, to determine and output an accurate determination of the projectile speed for one or more points of interest in its flight. Such determination of speed may, for instance, be the speed at the time of projectile release, even though range-related data is gathered later in the flight, when the projectile is traveling neither so fast, nor straight at the sensor. Such sensing device may employ inexpensive short-range acoustic Doppler, and be incorporated into a target device that automatically displays to a pitcher-in-training the speed and ball/strike condition of each pitch.

18 Claims, 23 Drawing Sheets

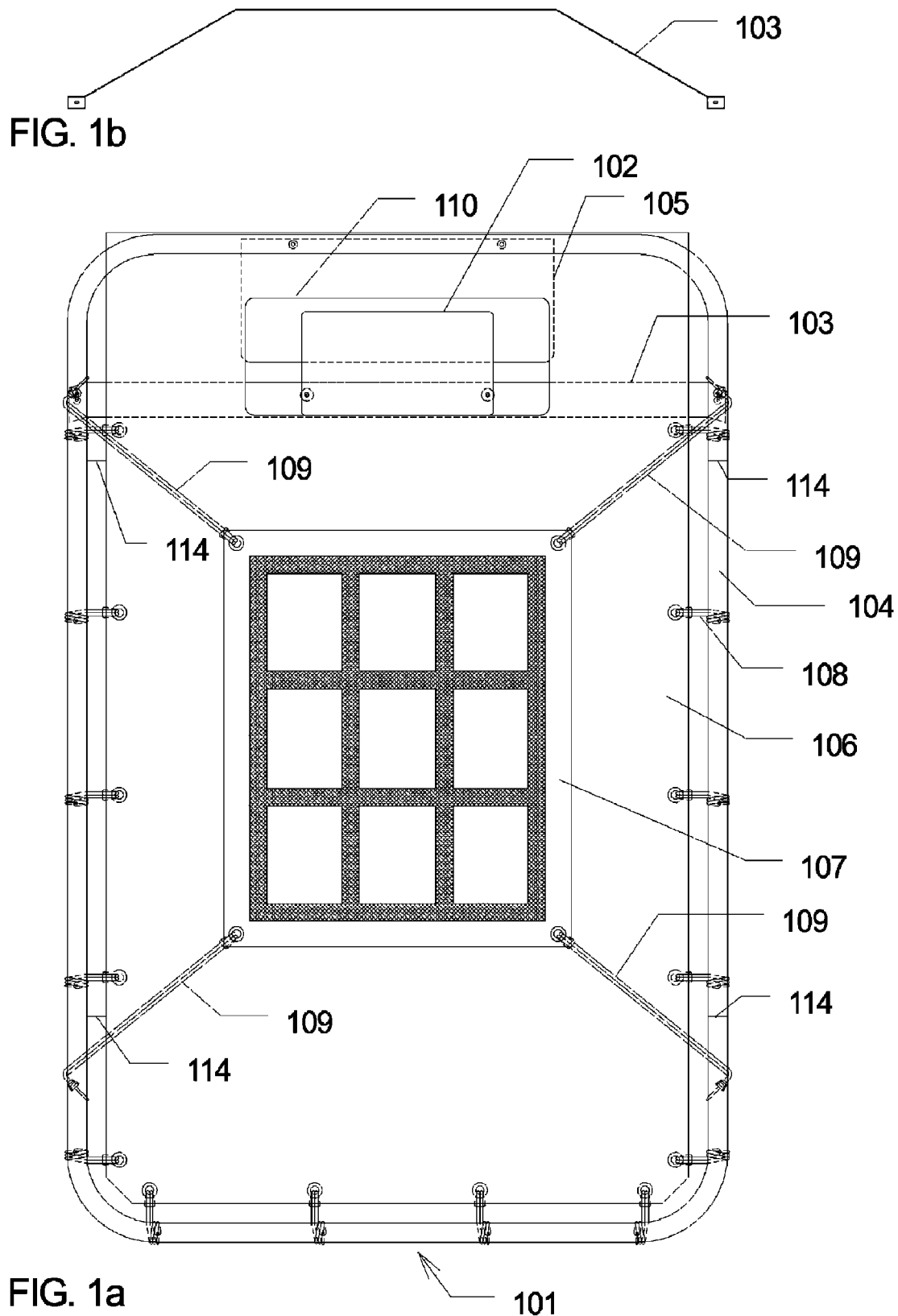

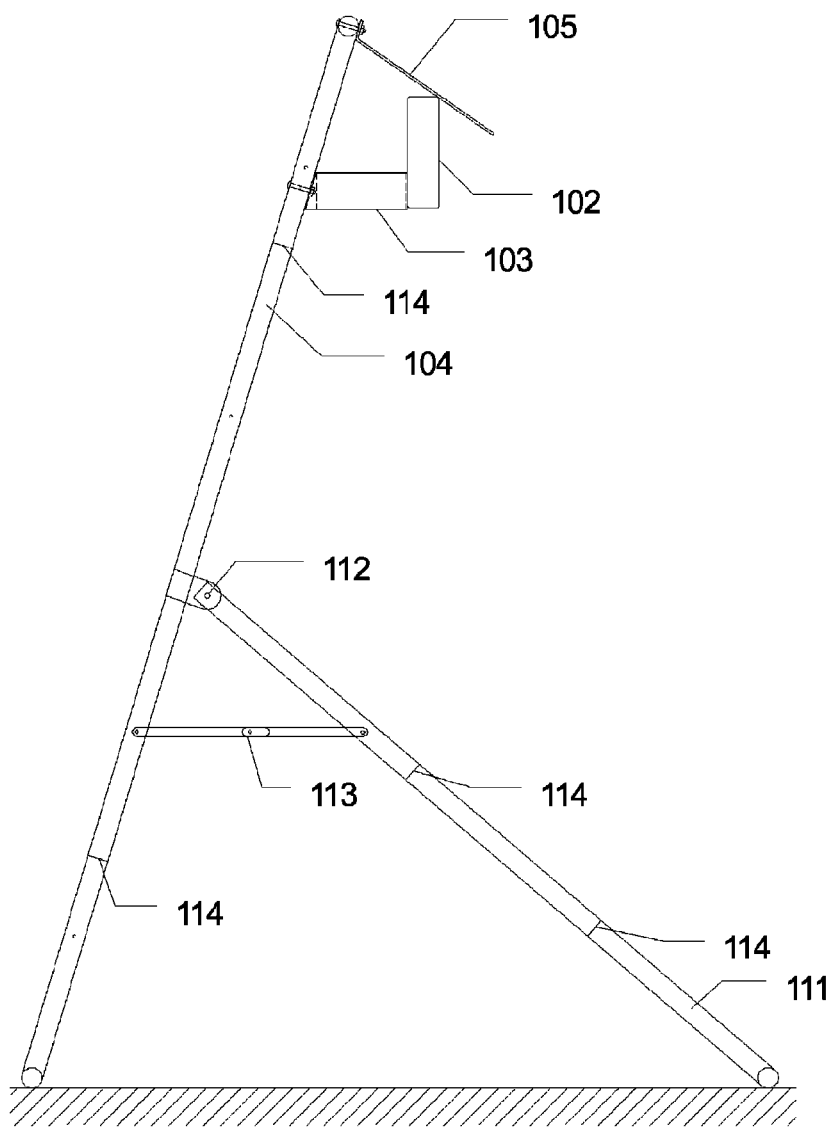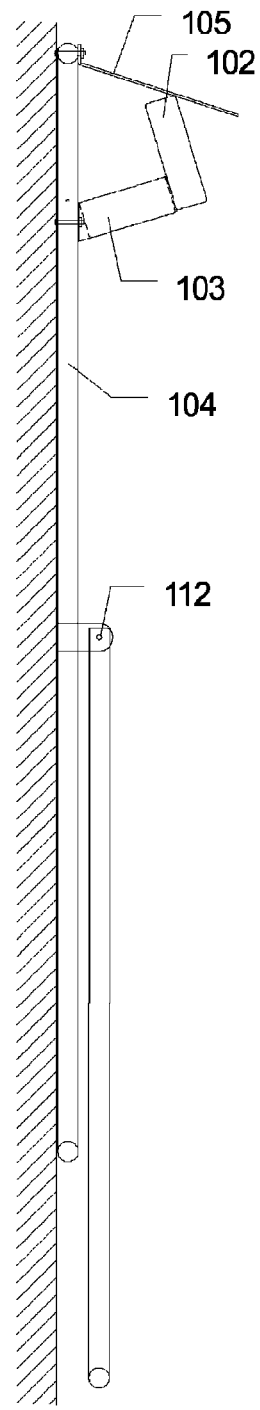
FIG. 1c
FIG. 1d

ELECTRONIC PITCHING TRAINER AND METHOD FOR DETERMINING THE TRUE SPEED OF A SPORTS PROJECTILE

CROSS REFERENCE TO RELATED APPLICATIONS

This application claims priority from U.S. Provisional Patent Application Ser. No. 60/963,793, filed on Aug. 7, 2007, entitled "Electronic Pitching Training and Method for Determining the True Speed of a Sports Projectile," which is hereby incorporated by reference herein.

BACKGROUND

The trajectory of a sports projectile in free flight is characterized by steadily changing coordinates of position and velocity. Certain more limited characteristics of the full trajectory may be of special interest, however—notably, the component of the initial release speed in the intended direction of flight. This is what is typically meant when referring to the "speed" of a pitch in baseball, or of a serve in tennis, or of a slapshot in hockey. There is a need, therefore, for accurate and practical devices to measure such speeds.

In recent years, such measurements have been made somewhat more practicable by the development of the radar gun, wherein the rate of change of the projectile's distance from the device (its "range rate") is taken from the Doppler shift of a reflected microwave signal. The release speed of the projectile may then be equated with the greatest range-rate measurement seen, as the speed of the sports projectiles of interest generally decrease monotonically after release.

Obtaining an accurate speed in this manner, however, is subject to difficulties and limitations. For instance, range-rate accurately reflects projectile speed only when the projectile is traveling straight at the measuring device. It may not be practical to meet this constraint if the intended path is not known in advance, or if the suitable locations for measurement are inaccessible, required for other uses, or out of the device's effective range. When the angle "theta" between the measuring line to the projectile and the projectile's line of travel is not zero, the measured speed will be diminished by a factor equal to the cosine of theta. The resulting error is sometimes known as the "cosine effect".

In addition, a range-rate measurement will be reflective of release speed only if it is taken at the moment just after release. A baseball pitch, for instance, may lose ten miles per hour on its way to the plate, due to air drag—the exact amount depending on initial speed and pitching distance, among other things. Late detection of the pitch also complicates the effect of cosine error. Since the measuring device is unlikely to be perfectly located, the relevant theta is likely to increase with time, and the degree of cosine error will be greater, the later the device first "picks up" the pitch. Theta will also change with time due to a path curvature that is usually dominated by gravitational arc.

Thus a conventional radar gun may be difficult to use properly. Furthermore, a conventional radar gun of sufficient quality and sensitivity to give reliable and accurate readings when used properly can be an expensive device.

Although briefly discussed above in terms of the baseball pitch, analogous problems apply to measuring the speeds of other sports projectiles.

Therefore, there is a continuing need for an improved method for measuring the true speed of a sports projectile.

More particularly, there is a need for such a method in application to an inexpensive and convenient pitching trainer device. There exist passive targets for pitching practice, but these do not provide all the performance feedback desired. To monitor pitch velocity, an additional person must typically be dedicated to operating a separate speed-measuring device, such as a radar gun, and calling out the results. Pitch capture nets may provide some indication of ball/strike performance, but require hand tallying of all balls retrieved from both inside and outside the nets. Also, the mechanical design of existing targets can be deficient, with pitches of even moderate speed able to cause significant damage.

Therefore, there is need for a pitching trainer device that presents the speed of each pitch to the user without the user needing to leave his pitching position, and without tying up another individual in holding a radar gun or reporting speeds. There is also a need for such a device, without significant additional complexity, to be able to report and tally ball/strike performance. There is also need for such a device with improved robustness of design.

OBJECTS

It is an object of the invention to provide a method for determining the speed of a sports projectile that is not traveling substantially straight at the measuring device.

It is an object of the invention to provide a method for determining the release speed of a sports projectile based on data gathered later in its trajectory, when it has slowed.

It is an object of the invention to provide a method for determining the release speed of a sports projectile, based on data gathered by an inexpensive measuring device having limited range, operating in or near a target.

It is an object of the invention to provide an automated impact locating means for detecting and reporting which of one or more distinct target zones a sports projectile may have struck.

It is an object of the invention to provide one or more distinct target zones upon which impact may be detected by remotely disposed sensing, which sensing may thus be consolidated and protected.

It is an object of the invention to provide one or more distinct target zones which may be easily adjustable.

It is an object of the invention to provide one or more distinct target zones which may be provided in multiple alternatives that are both simple and inexpensive.

It is an object of the invention to provide an accurate and inexpensive method for determining the release speed of a baseball in the context of a pitching trainer device.

It is an object of the invention to provide a pitching trainer method and device that further incorporates a simple and inexpensive way to determine ball/strike performance.

It is an object of the invention to provide a pitching trainer method and device that provides pitch speed and ball/strike indications to the user immediately and automatically, without the user leaving pitching position, and without requiring the participation of another individual.

SUMMARY

In a particular form, devices and methods implemented in accordance with the invention may comprise a strike-zone target, backstop curtain, support structure, and an electronic sensing/display module with embedded firmware procedures. These together provide a practice and training environment for pitching. The sensing/display module provides to the user, at pitching distance, a display of the speed and ball/strike status of the last pitch. The sensing of pitch speed may be accomplished by means of continuous-wave ultrasonic Doppler. Preferably an efficient resonant piezoelectric emitter and a wide-range electret microphone provide excellent signal-to-noise ratio at low cost. The target and curtain are provided in such a form as to produce differing impact sounds. A microphone—which may be disposed at a convenient and protective distance from the target—picks up impact sounds that may be electronically differentiated into balls and strikes. The microphone for ultrasonic Doppler detection and for ball/strike discrimination may be the same microphone. The design allows all sensors and electronics to be separated from the larger passive elements. The resulting sensing/display module is a compact, easily detached unit that simplifies manufacture, user assembly, and protective storage during inclement weather.

Thus methods implemented in accordance with the invention integrate into one inexpensive, practical and convenient package the known passive functions of:
  visible target definition, and
  backstop
  with novel automations of each of the active functions of:
  umpire;
  radar gun and operator;
  tally function; and
  immediate user feedback function.

In one important aspect, methods implemented in accordance with the invention comprise taking a range-related measurement at two or more times in the projectile's flight. These data are retained, along with their associated times of measurements. In one embodiment, a target exists in a known relation to the range-related measuring device, and a time of impact of the projectile upon the target may also be noted. From these data, parameters of a more complete trajectory are computed. The desired speed measurement is then computed with the aid of these parameters.

Broadly, the range-rate measuring device may depend upon any of several principles, such as, but not limited to: Doppler shift; increase in intensity of received energy radiated or reflected from the projectile; increase in angular subtense of a projectile image; and decrease in time-of-flight for a reflected pulse. In particular, it may respond to the Doppler shift of ultrasonic sound, radiated from the measuring device and reflected from the projectile. Whatever technique of range-rate measurement is employed, multiple measurement pairs comprising a range-rate value and a corresponding time-of-measurement value may be accumulated as the projectile nears the target. These data may thus sample a range-rate-versus-time curve of a particular shape. Such a history of range-related data may be used to implicitly identify plausible trajectories of a sports projectile, which trajectories are in turn associated with a narrow span of release speeds surrounding the true release speed. In this manner, an accurate release-speed estimate may be extrapolated to a value significantly greater than any of the range-rate measurements.

One embodiment employs a 40 kHz resonant emitter, along with a receiver comprising an electret microphone chosen for sensitivity in the 42-51 kHz range. Emitter and receiver may be located about 10 inches apart, and operated simultaneously. While waiting to detect and measure the range-rate of a pitched ball, the emitter may emit a constant, high-power sine wave at 40 kHz, which sound may, with the use of commonly available emitters, have an intensity of approximately 120 dB SPL at a distance of 1 foot. With use of appropriate combinations of filtering, amplification, and synchronous detection, the microphone output may be used to obtain a clean Doppler signal, neither overwhelmed nor degraded by the presence of a significant signal reflected from the back of a protective mesh window.

Although an ultrasonic emitter may be used for both emission and detection of ultrasound, as in pulsed time-of flight ranging, there may be difficulties in applying this technique to the ranging of a fast-moving object. The sound waves from a 40 kHz resonant emitter, for instance, return from a pitched baseball at a frequency roughly 3 kHz to 10 kHz higher, depending upon the speed of the pitch. As a sensitive resonant detector may offer a sensitive bandwidth of about 1 kHz, neither the emitter itself, nor even a differently tuned detector of otherwise similar design may be well suited for this task. Also, for the emitter to be used as detector, it must be pulsed off long enough to await and detect the reflected wave. For a fast moving object detectable only at close range, the required spacing of pulses may not provide appropriate and sufficient data points for subtle discrimination of range-rate changes.

Embodiments of the invention thus teach how a resonant emitter may be combined with a separate microphone of broader bandwidth capability, providing thereby an admirable capability to measure the Doppler range-rate of a sports projectile.

BRIEF DESCRIPTION OF THE DRAWINGS

FIG. 1a is a front view of one embodiment of the invention.

FIG. 1b is a top view of a bracket that may be used to mount an electronics module in the embodiment of FIG. 1a.

FIG. 1c is a side view of the embodiment of FIG. 1a.

FIG. 1d is a side view of the embodiment of FIG. 1a, hanging in storage.

DETAILED DESCRIPTION

Physical Structure of One Embodiment

Figure 2:
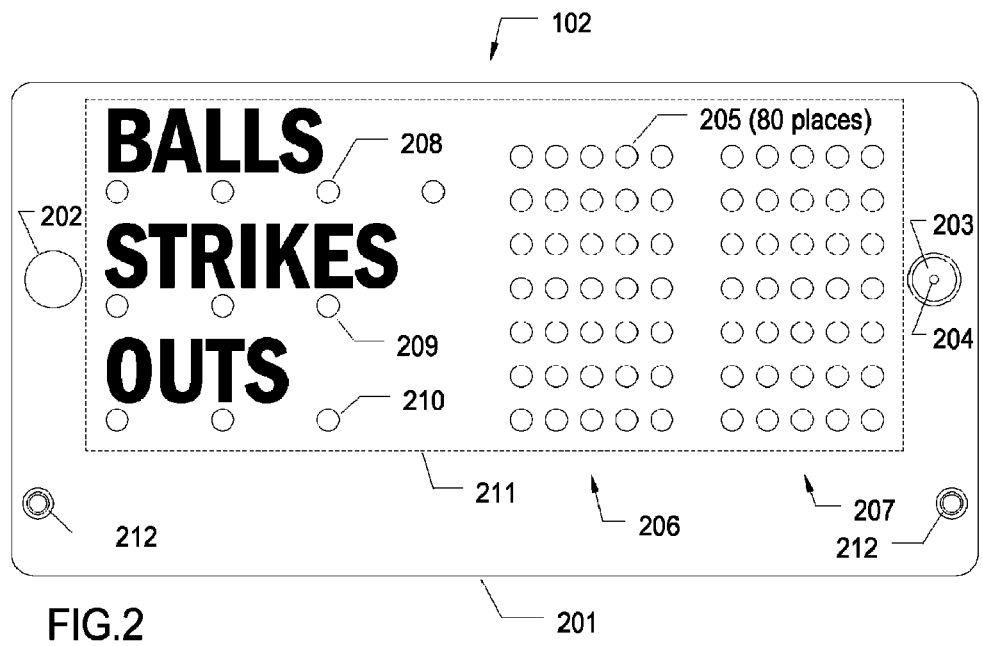
FIG. 2 depicts the front face of an electronics module of one embodiment of the invention.

FIGS. 1a-1d depict a pitching trainer 101 implemented according to one embodiment of the invention. Principal components of pitching trainer 101 comprise electronics module 102, strike zone target sheet 107, backstop curtain 106, and frame 104. Backstop curtain 106 carries a tough mesh window 110 through which the user may see a large LED display on the front of electronics module 102. This display may report the release speed of the last pitch thrown, along with a tally of balls, strikes and outs. Mesh window 110 also allows the passage of ultrasonic sound transmitted from and received by transducers in electronics module 102.

Electronics module 102 is seen supported from frame 104 by mounting strap 103. Mounting strap 103 may be of sheet steel, formed at an angle as shown in FIG. 1b, such as to provide a spring cushioning effect for the electronics module when balls impact the face of pitching trainer 101. Visor 105 may be provided to shield electronics module 102 from rain, and from excess incident light that could reduce display contrast. Visor 105 may be of opaque plastic attached to frame 104, and may rest against the upper edge of electronics module 102. Also supported from frame 104 is backstop curtain 106. Backstop curtain 106 may be of vinyl cloth. It may carry a channel, folded-over and stitched along the top edge, which may be slid onto the upper bar of frame 104 at assembly. Further attachment to frame 104 may be provided through elastic cords 108 in, for instance, 14 places, each cord looping through a grommet in backstop curtain 106, then wrapping around from behind to clip into holes in frame 104 through attached hooks. The length and tension of elastic cords 108 is chosen to provide enough yield to protect the curtain and cords themselves from damage, yet not so much as to allow a ball impacting over mesh window 110 to reach the face of electronics module 102. In a novel design feature, elastic cords 108 may wrap by a substantial amount, such as up to a full turn or more, around frame 104 before attaching. Thus the gap between curtain 106 and frame 104 may be kept desirably small, while the wrapped cord provides a long elastic reserve. The frame may be made of smoothly finished tubular steel, allowing the reserve of wrapped cord to stretch with a useful but not excessive damping effect from the residual friction. This design has been found to provide significantly improved protection from pitch damage.

Strike zone target sheet 107 provides a visible target to the user, and a distinctive impact sound to a transducer in electronics module 102. It may consist of 0.020" thick polycarbonate, sized, for instance, for either a little league or a big league strike zone. It may be supported from frame 104 by elastic cords 109 running to grommets in its four corners. Multiple attachment holes in frame 104 for elastic cords 109 may provide the user with a choice of strike zone heights. Elastic cords 109 may pass around frame 104 from the front, before hooking into place in provided holes. Elastic cords 109 may then be of sufficient tension to hold target sheet 107 effectively flat. If backstop curtain 106 has been attached as described, it will tend to lie in the plane of the rear edge of the tubing comprising frame 104, while the target sheet 107 may lie in the plane of the front edge. Thus target sheet 107 may be held at a small spacing in front of backstop curtain 106, such that the sound of an impact may ring more freely in target sheet 107. At the same time, backstop curtain 106 may protect target sheet 107 by absorbing the bulk of a strike zone impact and preventing excessive deformation or corner stress in target sheet 107.

Frame 104 may be held erect by frame support 111 as seen in FIG. 1c. Frame support 111 may comprise tubing bent into a U-shape, attaching at both sides to frame 104 through hinges 112 and elbow brackets 113. Both frame 104 and frame support 111 may comprise multiple segments of steel tubing, appropriately formed, such that the user may assemble the unit by sliding these together at junctions 114. When the unit is raised and the elbow brackets folded, the unit may be hung for storage as depicted in FIG. 1d.

FIG. 2 depicts the front face of electronics module 102. Plastic molding 201 forms the front half of the module's clam-shell enclosure. Threaded inserts 212 receive thumbscrews through holes in mounting strap 103, allowing easy removal of electronics module 102 for protective storage. LEDs 205 shine through holes in molding 201 in 80 places, providing desired display functions. Seventy of these LEDs group into the two 5×7 character displays, high-order character array 206 and low-order character array 207. The LEDs for these arrays may be red or red-orange in color, for high-efficiency at low cost. A row of green LEDs 208 may be provided to show the ball count of a simulated at-bat; a row of three red LEDs 209 may be provided to show the strike count of a simulated at-bat, and a row of three yellow lights 210 may be provided to show the outs of a simulated inning. An ultrasonic emitter 202 may mount flush through molding 201, as shown. Emitter 202 may be an inexpensive 40 kHz resonant piezoelectric design of known type. A cone-shaped receiving horn 203 may be formed into molding 201, with hole 204 conducting sound to a microphone behind. LEDs 205 may be of a narrow radiating angle design, such as 20°, for greatest forward brightness, but with all of the rectangular display area covered by transparent lenticular plastic sheet 211. The groves of lenticular sheet 211 may be oriented vertically, to increase horizontal light dispersion. Thus observers significantly to either side of the pitcher may be able to see the display clearly, without light output being wasted on angles too high or low to be seen. Lenticular sheet 211 may also prevent entry of dirt or moisture through the 80 LED holes, and may be printed with "BALLS", "STRIKES" and "OUTS" legends on its backside.

Figure 3:
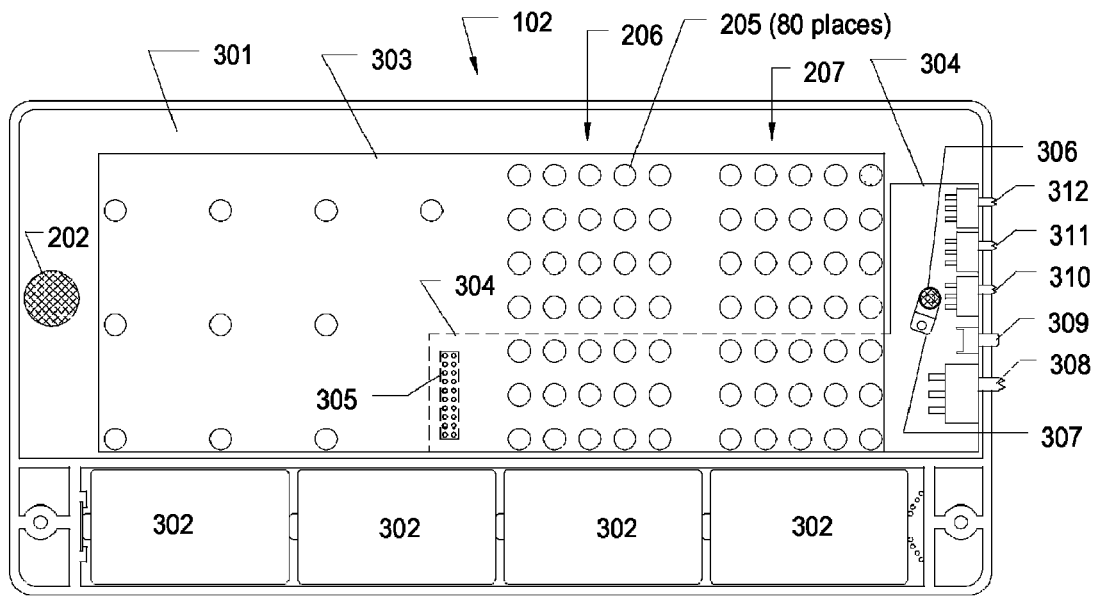
FIG. 3 depicts an arrangement of components within the electronics module depicted in FIG. 2.

Turning to FIG. 3, electronics module 102 is again depicted, but here with front molding 201 made invisibly transparent to expose components behind. These include rear molding 301, the battery comprising the 4 alkaline D-cells 302, display circuit board 303, and microprocessor control unit (MCU) circuit board 304. MCU board 304 carries an MCU chip, such as an Atmel Atmega 168, emitter drive circuitry, microphone preamplifier and signal filtering analog circuitry, power control and filtering circuitry, and display multiplexing circuitry. Display board 303 carries the 80 LEDs 205, along with current limiting resistors and current switching transistors. The LEDs are organized logically as eight rows of ten each, multiplexed such that the illuminated LEDs of each row shine for 1 ms, with the full display refreshing at 125 Hz. Seven of the eight rows are composed of the concatenated rows of character areas 206 and 207, while the eighth logical row is composed of the remaining ten "BALLS", "STRIKES" and "OUTS" LEDs. Power connections, plus the 18 logic-level multiplex drive lines, are supplied from MCU board 304, which rests about ½" behind, through connector 305. 6 Volt power from cells 302 is wired to MCU board 304, and switched through power switch 308. Operational control switches 309 through 312 also reside on the MCU board, and are polled by the MCU chip. Microphone 306 may be of an inexpensive electret design, and also of a model type—such as, for instance, the Panasonic WM-61A—selected for sensitive ultrasonic response extending up to at least 50 kHz. Microphone 306 is supported by molded bracket 307 such that it is centered firmly against hole 204 from behind.

Electronic Structure of One Embodiment

FIG. 4, FIG. 5, and FIGS. 7-10 depict the electronic circuitry of one embodiment of the present invention.

Figure 4:
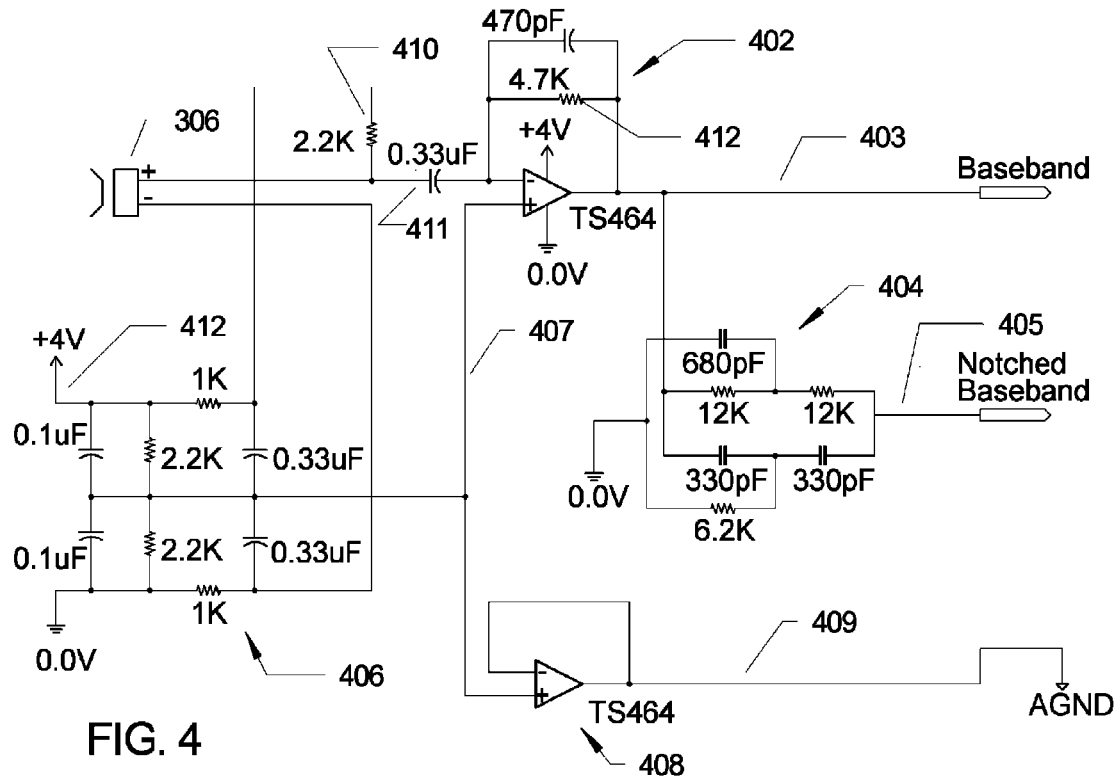
FIG. 4 depicts aspects of electronic circuitry within one embodiment of the invention that relate principally to a microphone signal.

Turning to FIG. 4, microphone 306 may be of common electret design, although it may be of a specific type chosen for sensitive ultrasonic response in the range of, for instance, 42 kHz to 51 kHz. The Panasonic WM-61A is one example of a suitable unit. While sensitivity may drop steadily with increasing frequency in the ultrasonic range, the ratio from 42 kHz to 51 kHz may be modest, and may be compensated, if desired, by adjusting the design of later signal filtering.

Microphone 306 provides signal to preamplifier 402, generating as output the baseband signal 403. Also, through passive twin-T notch filter 404 the baseband signal 403 becomes the notched baseband signal 405. Bias and filtering circuitry 406 divides a regulated 4.0 volts 412 to provide 2.0 volts onto conductor 407, and also through buffer 408 onto conductor 409. This 2.0 volts is provided as the ground signal reference for the operational-amplifier circuitry. Baseband signal 403 typically carries a significant sinewave component at 40 kHz. To aid in impact detection and ball/strike discrimination, notch filter 404 is provided to suppress this, while leaving the audio frequency range largely unaffected. Notched baseband signal 405 may connect directly to a microprocessor A/D input for analysis of the substantial audio-frequency signal that may be generated when a baseball impacts strike zone target sheet 107, or backstop curtain 106.

Bias and filtering circuitry 406 also provides filtered and noise-reduced potentials near 0.0 volts and 4.0 volts for energizing microphone 306. Resistor 410 establishes the level of DC current flow through microphone 306, while the relatively large value of capacitor 411 diverts all AC current at frequencies of interest to the summing junction of preamplifier 402, and thence through current-to-voltage converting resistor 412. In contrast to common practice, resistor 412 is the first resistor to develop voltage from the AC current generated by microphone 306. Since resistor 410 is not used for this purpose, little or no AC voltage is developed across the microphone itself. Therefore, any feedback or shunt capacitances associated with the microphone output FET do not tend to reduce the microphone's high-frequency response.

Figure 5:
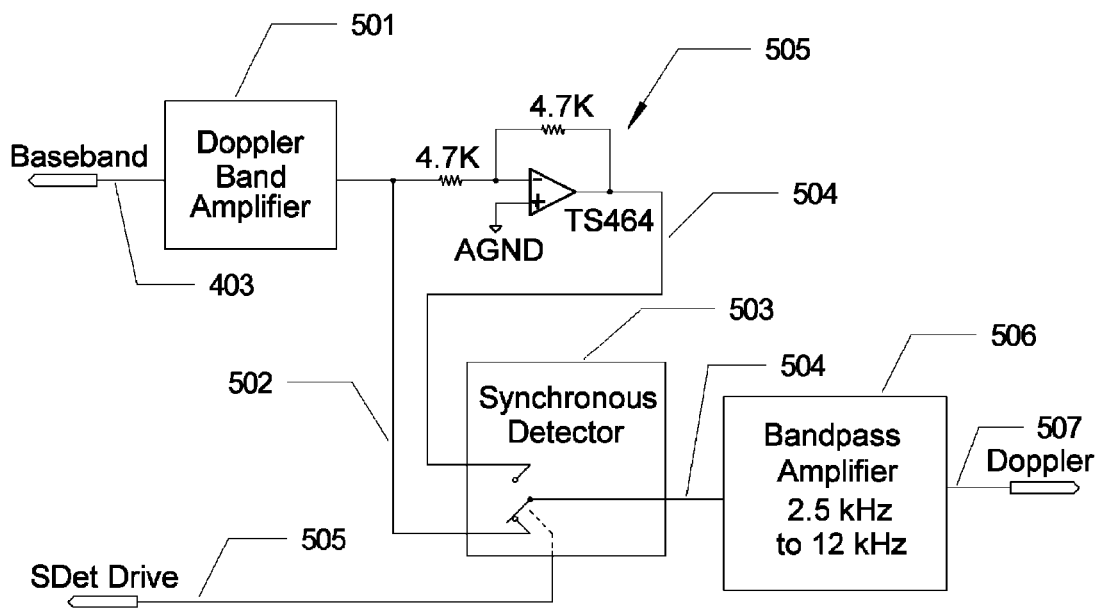
FIG. 5 depicts further aspects of electronic circuitry within one embodiment of the invention that principally relate to a microphone signal.

FIG. 5 depicts the analog processing that extracts the Doppler signal. Baseband signal 403 contains audio frequencies from environmental acoustic noise, a 40 kHz component resulting from proximal pickup of sound from emitter 202, ultrasonic background noises, including possible noises at image frequencies below 40 kHz, and possible electronic interference noise, as from AM radio transmissions, at frequencies much higher than 40 kHz. Also present on Baseband signal 403 are any ultrasonic signals somewhat above 40 kHz reflected from a pitched ball. Doppler band amplifier 501 is provided to preferentially boost these reflected Doppler signals. Amplified output 502 is provided to synchronous detector 503, along with a precisely inverted form 504 generated by unity-gain inverting amplifier 505. Synchronous detector 503 may comprise a CMOS analog switch, such as one section of a 74HC4053. Detected signal 504 alternately comprises time segments of amplified output 502 and its inverse 504, as determined by the switch control signal SDet_Drive 505. SDet_Drive 505 is a square-wave signal of 50% duty-cycle at 40 kHz, derived from the same ultimate timing source as the 40 kHz emitter excitation signal. Thus signal 504, by the heterodyning effect of synchronous detector 503, comprises the following components:

1. A very low frequency or DC component that results from the synchronous rectification of the 40 kHz sinewave present on signal 502. This component may slowly vary in magnitude and sign, as the phase of the proximally reflected emitter output shifts.
2. A copy of the desired Doppler signal, now shifted down by 40 kHz. Thus the signal of interest here falls into the audio band, between, for instance, 2.5 kHz and 12 kHz.
3. An image signal, reflecting the presence of any acoustic or electronic noise originally present in the range of 28 kHz to 37.5 kHz. While no significant signal is normally to be expected in this range, any possible interference may be further reduced by judicious design of Doppler band amplifier 501.
4. A variety of much higher frequency components, including lower amplitude multiples of 40 kHz, higher amplitude multiples of 80 kHz, and multiple high frequency images of the Doppler signal.

Bandpass amplifier 506 is provided to selectively boost the desired Doppler signal, while strongly suppressing the low and high frequency components listed as 1 and 4, above. Signal Doppler 507 is then output at a level suitable to connect directly to a microprocessor A/D input, and need not be sampled at a rate higher than necessary for audio band signals.

Figure 6A:
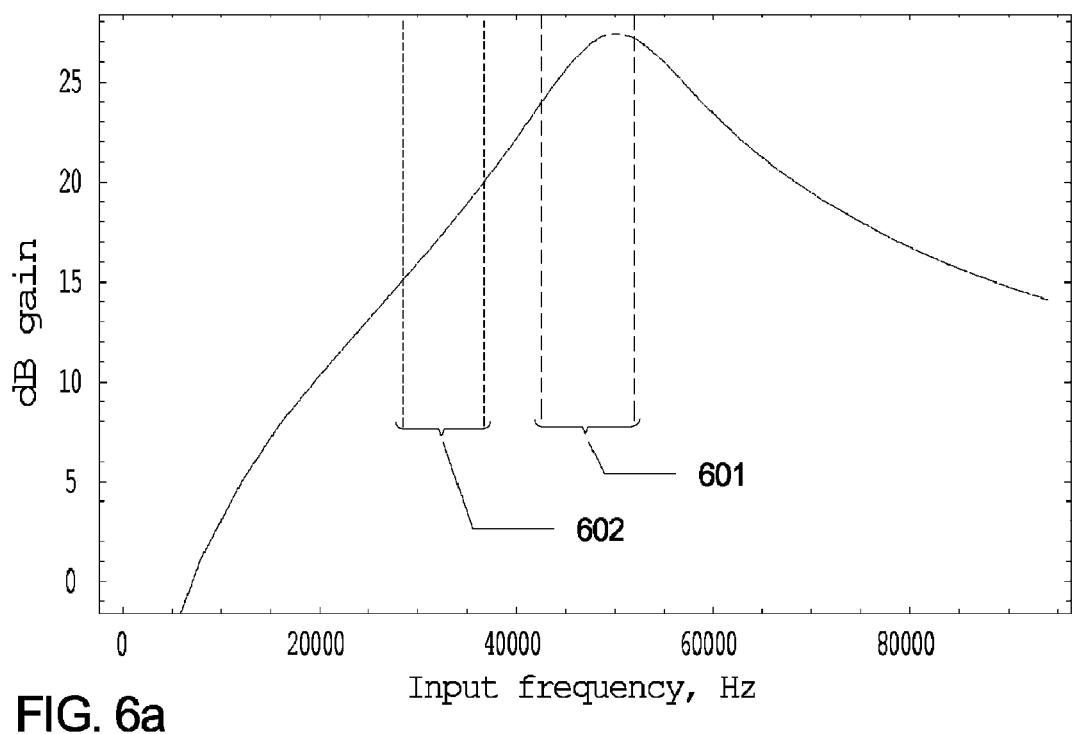
FIG. 6a and FIG. 6b depict system gain versus frequency curves that may be used within one embodiment of the invention.
Figure 6B:
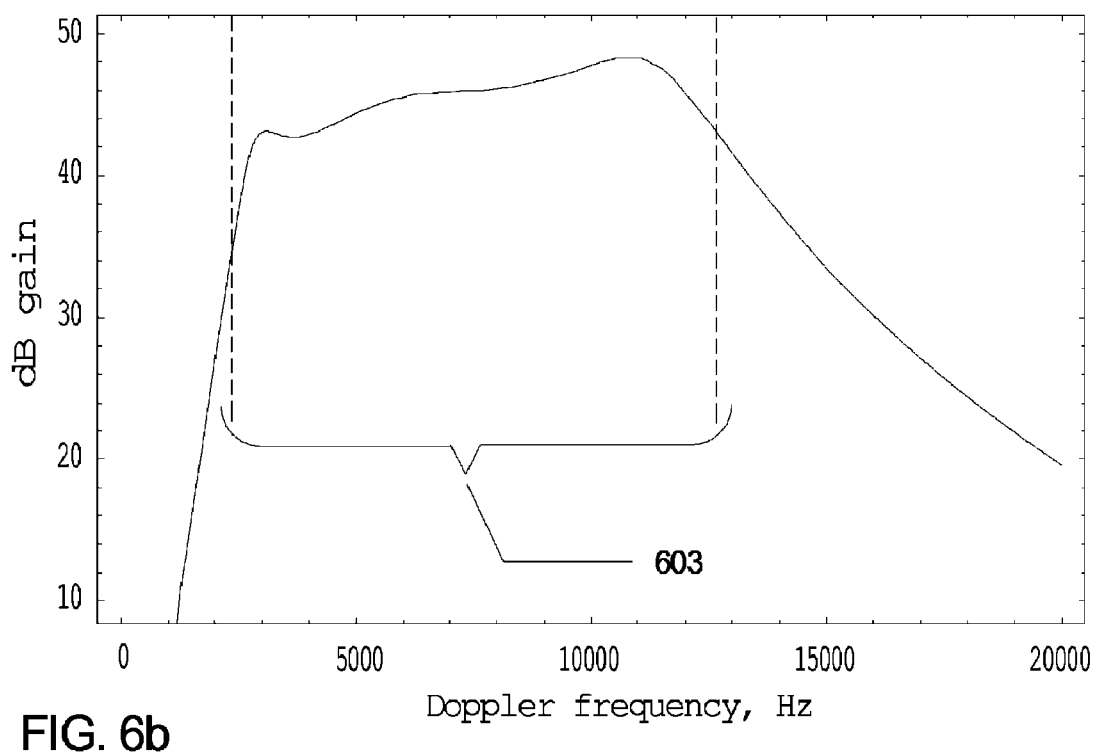

FIGS. 6a-6b depict system gain versus frequency curves that may be chosen. The voltage ratio of signal 502 with respect to signal 403 is depicted in FIG. 6a. The voltage ratio of signal 507 with respect to signal 403 is depicted in FIG. 6b, it being understood that the frequencies depicted in FIG. 6b correspond to signals coming in 40 kHz higher on signal 403. FIG. 6a, then, corresponds directly to a gain versus frequency curve suitable for Doppler band amplifier 501. Doppler band Amplifier 501 may comprise a single-section, multiple-feedback bandpass filter of known design, offering a pole-pair plus a zero at the origin. The pole-pair may have a frequency of 49.5 k Hz and a Q of 6.7, and there may be an overall gain of 27 dB at 47 kHz. The resulting shape, seen in FIG. 6a, may be peaked somewhat above the center of the Doppler band of interest 601, so as to provide a degree of rejection of the image frequency range 602.

Bandpass amplifier 506 may comprise three cascaded filter sections, each of the multiple-feedback bandpass type. The resulting transfer function has three zeros at the origin, and three pole-pairs. These pole pairs may offer a first frequency of 2.8 kHz, with Q of 6.3, and gain at 7 kHz of 7.0 dB; a second frequency of 5.4 k Hz, with Q of 2.35, and gain at 7 kHz of 4.0 dB; and a third frequency of 11.3 kHz, with Q of 7.5, and gain at 7 kHz of 12 dB.

FIG. 6b then shows the composite system response to microphone preamp signals ranging from 40 kHz to 60 kHz. The response shape, and the limits of the Doppler passband 603, are dominated by the characteristics of bandpass amplifier 506; however the plot also includes the effects of Doppler band amplifier 501, and an expected detector gain of −3.9 dB. The gentle roll-up in the passband is provided to compensate for a similar roll-off in the response of microphone 306. The limits for reliable pitch speed determination then lie at approximately the bandpass edges indicated; these correspond in practice to a range of just over 20 MPH to a little over 100 MPH.

Figure 7:
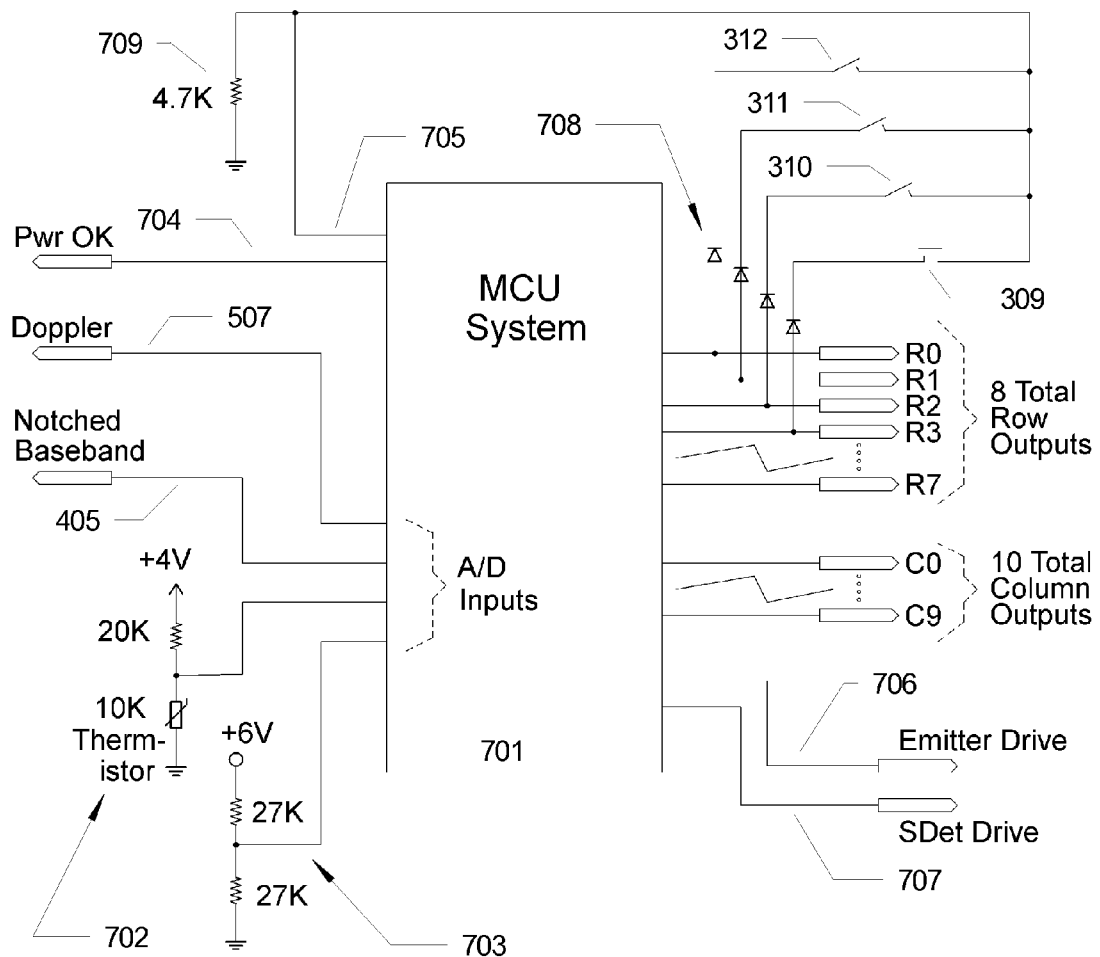
FIG. 7 depicts aspects of electronic circuitry within one embodiment of the invention that relate principally to an embedded microcontroller.

Turning to FIG. 7, MCU system 701 may be of typical known design, and may comprise an embedded programmable microcontroller unit along with associated components, such as clock crystal and power bypassing capacitors. An inexpensive flash-programmable part may be used, such as the Atmel AtMega168. In such a case, the limited pin count of the microcontroller chip may be complemented with a few additional logic chips. A 10-bit A/D converter with input multiplexer may be integrated within MCU system 701, for instance as part of the microcontroller chip itself, and may respond over an input voltage range of 0.0 volts to 4.0 volts. Input signals provided may include Doppler signal 507, Notched Baseband signal 405, a signal indicative of ambient temperature from thermistor circuit 702, and a signal indicative of battery voltage from divider circuit 703. Digital signal PwrOK 704 may also be input to MCU system 701 to signal the adequacy of battery power. An additional digital input may receive signal 705, which is developed by polling the states of operating switches 309 through 312. Outputs 706 and 707 carry 40 kHz square wave signals of 50% duty cycle. SDet Drive signal 707 may control the switching of synchronous detector 503, while the logical AND of Emitter Drive signal 706 and SDet Drive signal 707 may control excitation of the ultrasonic emitter 202.

The LED display may be controlled by the 8 row outputs R0 through R7, and by the 10 column outputs C0 through C9. The 10 column outputs may encode, in parallel, the ON/OFF states of a logical row of 10 LEDs, while one of the 8 row outputs at any moment may be at logic high to indicate which row is to be so energized. Within MCU system 701, ancillary digital logic, such as decoders and shift registers, may be used to derive the 18 display drive outputs from a much smaller count of microcontroller chip pins. Diodes 708 operate with pull-down resistor 709 to generate an AND-OR logic of the operating switches and certain row outputs, such that if R0 is currently the high row, AND if switch 312 is closed, signal 705 will be read by the MCU system as at a logic high, OR if one of the other row outputs is high while its corresponding switch is closed, signal 705 will be read as high.

Figure 8:
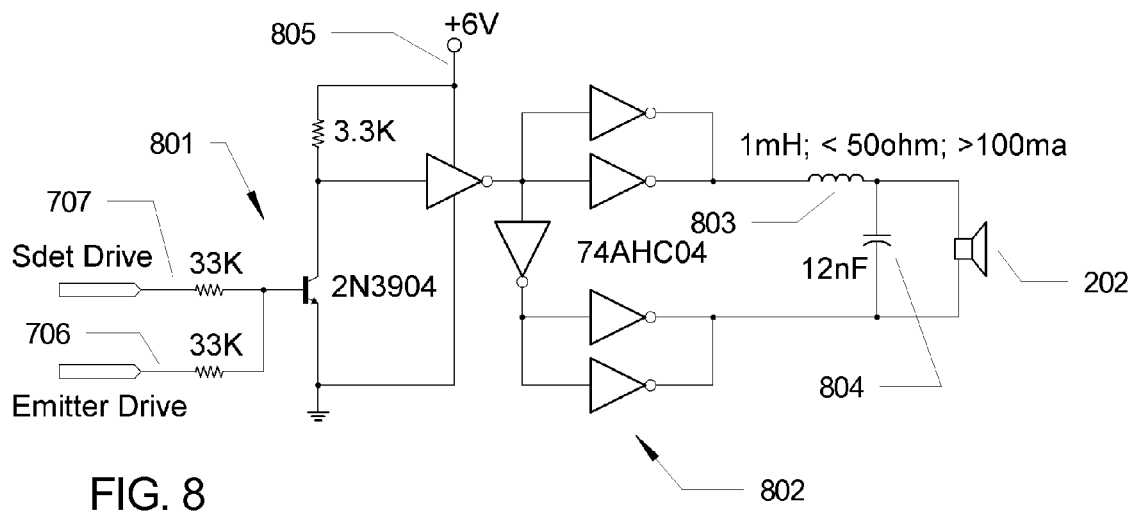
FIG. 8 depicts aspects of electronic circuitry within one embodiment of the invention that relate principally to ultrasonic sound generation.

Turning to FIG. 8, Emitter Drive signal 706 and SDet Drive signal 707 are combined in discrete AND circuit 801. A hex inverter IC may be wired to form bridge driver 802, switched by the output of circuit 801. The IC of driver 802, for instance a 74AHC04, may be selected for high output current capability. Ultrasonic emitter 202 may be of resonant piezoelectric design, such as the 40 kHz Suny Electronics TCT40-16T1. Effective excitation of devices of this kind requires, however, a substantially higher drive voltage than, say, the 12 volts peak-to-peak that is the greatest value available directly from bridge drive off a 6-volt battery. The provision of inductor 803 and capacitor 804 address this problem in a novel and effective manner. While the roughly 2 nF shunt capacitance of emitter 202 might nominally be series resonated at 40 kHz with an inductor of higher inductance, the resulting reactances at resonance would be too high to allow significant Q, given the radiative dissipation of the emitter. Adding the further shunt capacitance of 804 in combination with a larger inductor, however, allows the Q to be increased several-fold. This in turn makes substantial voltage gain possible, such that over 40 volts peak-to-peak may be maintained across emitter 202 without use of a transformer. Since driver 802 runs off unregulated battery voltage 805, there might be the potential for substantial output variation over battery life. MCU system 701, however, may manipulate the relative phases of signals 706 and 707 to control the duty cycle of driver 802. With reference to battery voltage measured by MCU system 701, this control may be used to compensate partly or fully for battery voltage variation, and to prevent damaging drive levels from reaching emitter 202.

Figure 9:
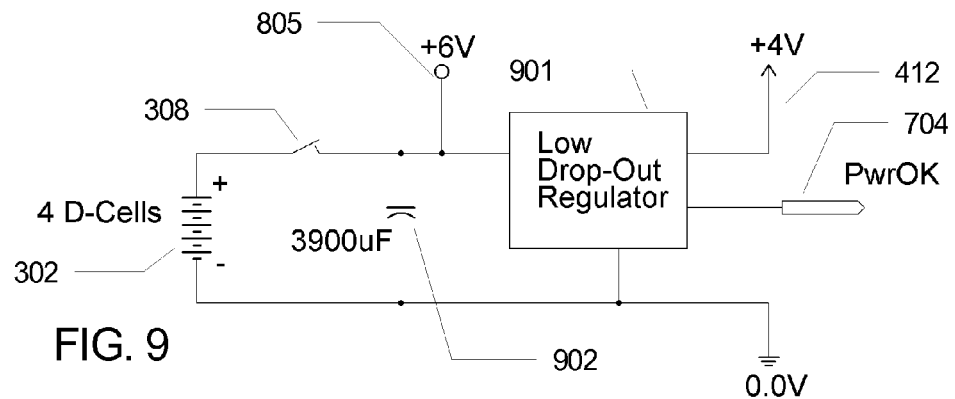
FIG. 9 depicts aspects of electronic circuitry within one embodiment of the invention that relate principally to power provisions.

FIG. 9 depicts power provisioning that may be employed within electronics module 102. Battery 302 may comprise four alkaline D cells, the use of relatively high capacity cells being dictated primarily by the current requirements of the large, sunlight-readable LED display. A simple series pass regulator 901 may be of low drop-out design, such as provided by an IC of type LP2951. Regulator 901 supplies a steady, noise-limited 4.0 volt supply 412, which may be used to power all analog and microprocessor electronics. Regulator 901 may also supply PwrOK signal 704 to MCU system 701, as stated above. Overall unit function may be satisfactory for all battery voltages down to just over 4.0 volts, at which point signal 704 may transition to a low level, signaling some initial diminution in regulated voltage 412. Switched battery voltage 805 may be supplied to circuits requiring greater current, such as the emitter and LED driver circuits. A relatively large capacitance 902 may be provided to smooth out the current demands of the display, which may fluctuate on an 8 ms cycle. The resulting reduction of dips in voltage 805 may then extend effective battery life.

Figure 10:
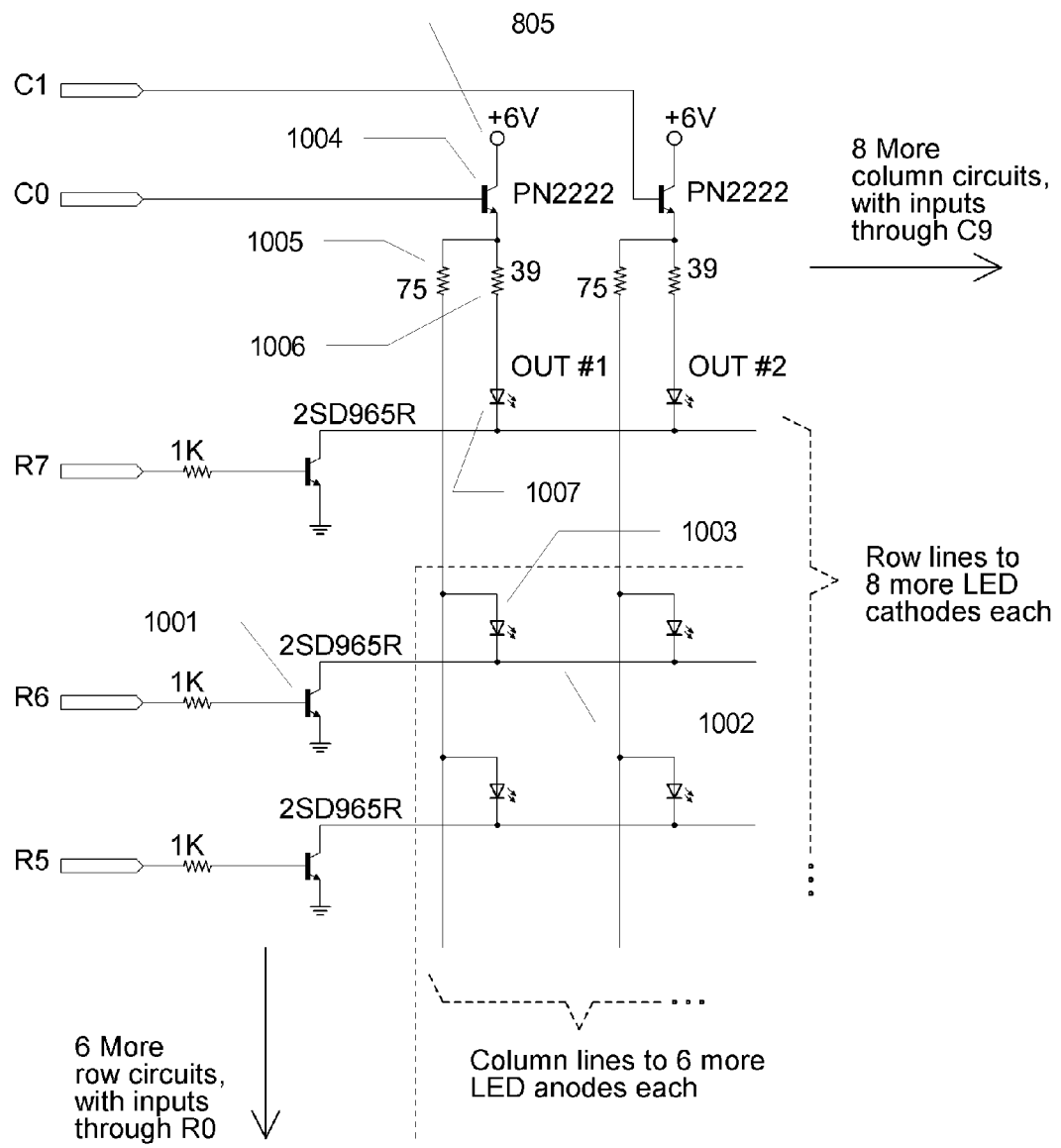
FIG. 10 depicts aspects of electronic circuitry within one embodiment of the invention that relate principally to data display.

FIG. 10 depicts, in abbreviated form, one drive arrangement that may be used for the array of LEDs constituting the display. When, for instance, row output R6 from MCU system 701 is high, row array line 1002 is pulled to battery return voltage by driver transistor 1001. Row array line 1002 may be connected to, for instance, the cathodes of the 10 LEDs comprising the top rows of the two 5 by 7 character arrays. Since no other row output is simultaneously high, there will not be a return path available for current through any other than these ten LEDs. Presuming that LED 1003, for instance, is to be illuminated, column line C0 will be set high by MCU system 701. Current then passes from unregulated battery supply 805, through transistor 1004 and current limiting resistor 1005 to the anode of LED 1003. Since the voltage level on column line C0 may be derived from regulated 4.0 volts by CMOS logic within MCU system 701, the voltage drop across resistor 1005, and therefore the brightness of LED 1003, may be rendered independent of the decline of voltage 805 over battery life. Thus each of the column drive transistors performs also a second function as a regulator. Row output R7 may be used to energize the 10 LEDs used for BALL, STRIKE, and OUT indications. These LEDs may be of different colors, and therefore of different efficiencies, than each other, or than those of the character arrays. For this reason, dedicated current limiting resistors may be provided to balance the brightness of the BALL, STRIKE, and OUT LEDs. Thus, for instance, resistor 1006 may provide greater current to a yellow LED 1007 used to indicate the first out. Successive rows of the display may be energized for 1 ms periods each, leading to a display refresh rate of 125 Hz. In an alternative embodiment, the total brightness of the BALL, STRIKE, and OUT LEDs may be enhanced by allotting them two row periods, for a total of nine 1 ms periods per refresh.

Data and Data Analysis

Figure 11A:
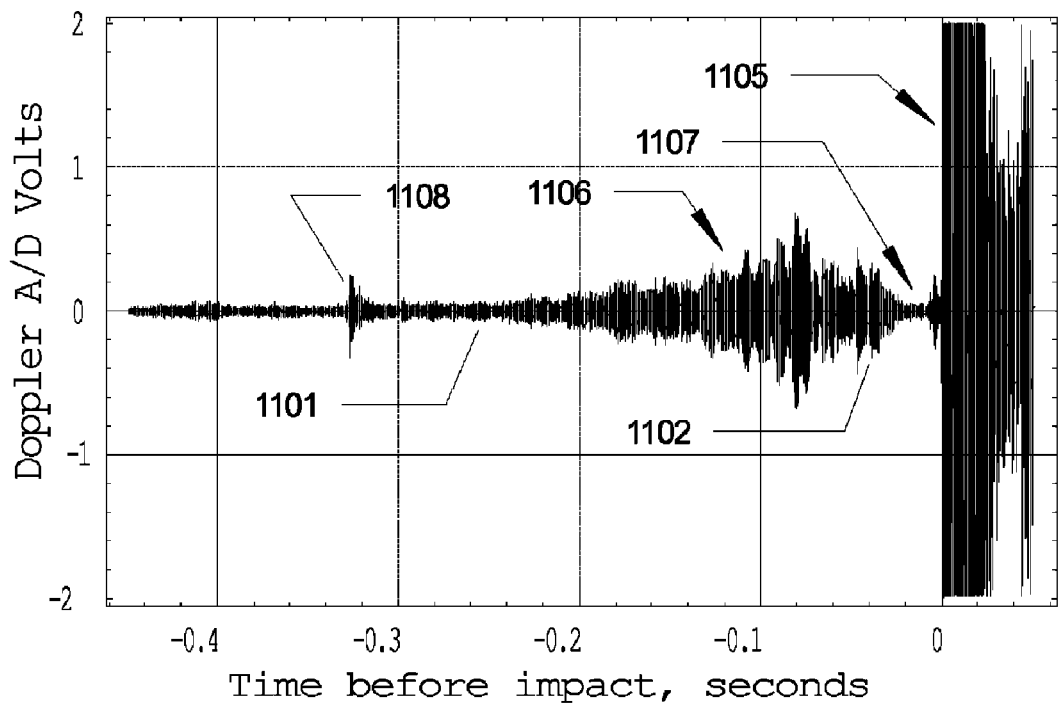
FIGS. 11a-11d depict a typical time course of signals that may be used in determining sports projectile speed in accordance with the method of the invention.
Figure 11B:
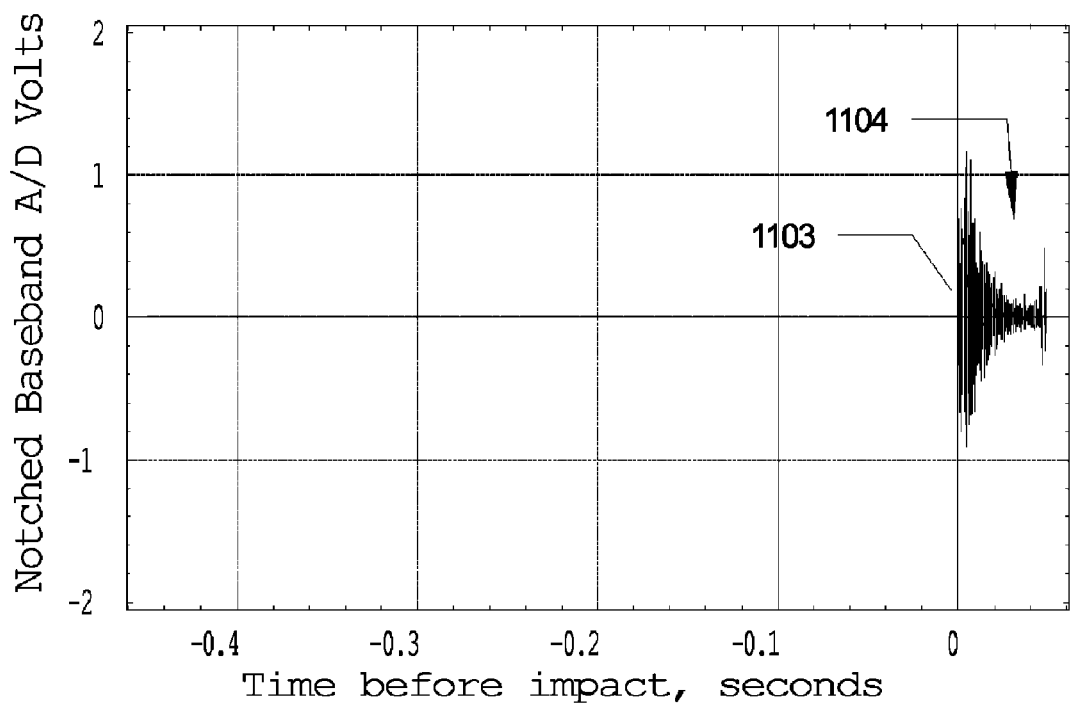
Figure 11C:
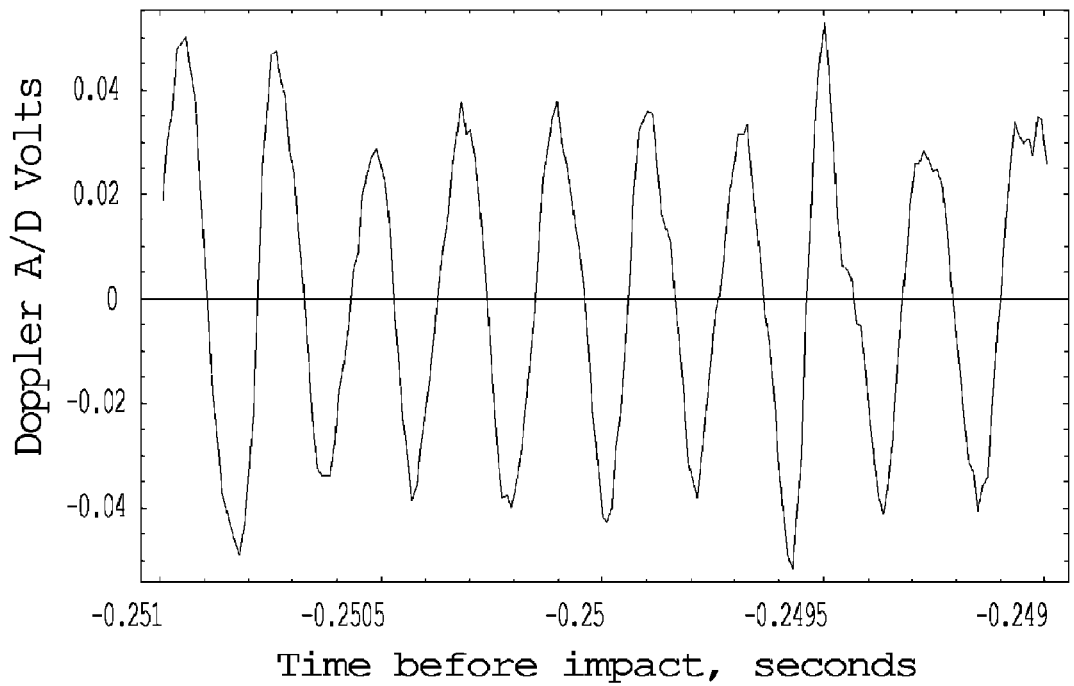
Figure 11D:
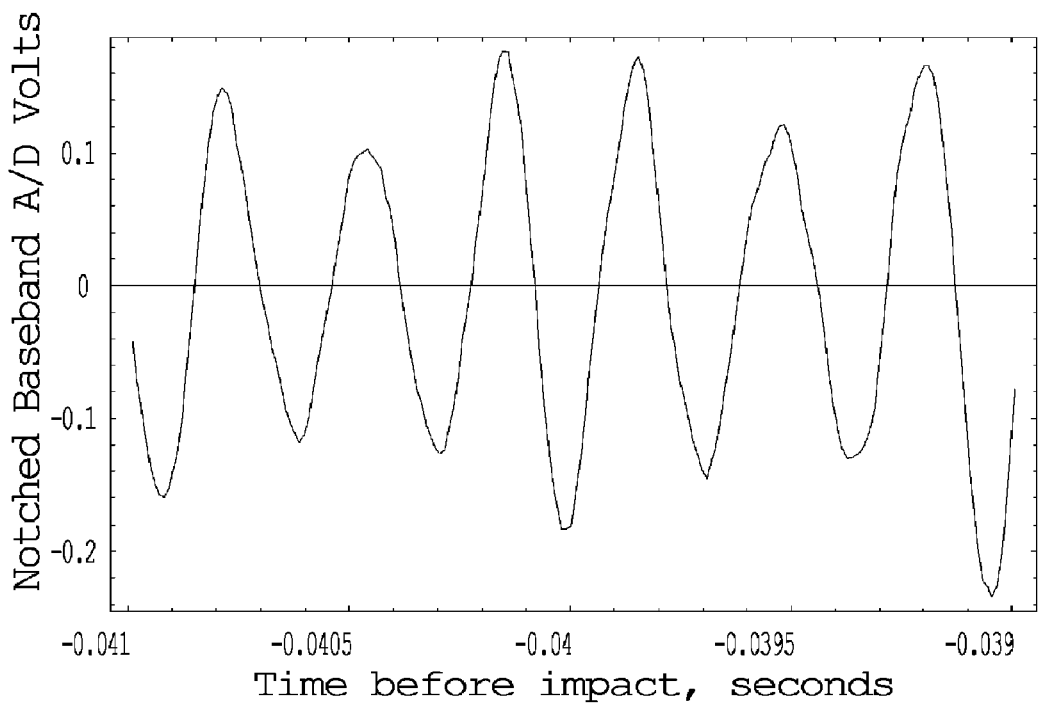

FIGS. 11a-11d depict activity that may be seen in the pitch-related data signals 507 and 405 during a typical pitch. For the 48 MPH pitch shown, the release time at big league pitching distance will have occurred at about −0.8 seconds, or about 0.8 seconds before target impact. With a proximal detection method, however, useful Doppler data may be confined to the last few tenths of a second before impact, depending upon pitch speed, pitch height, and possible conditions of interfering noise. The reference point for time 0.0 seconds in FIGS. 11a-11d is taken at the moment the leading event 1103 of the audio-range impact noise 1104 is detected in the notched baseband signal 405. Doppler energy 1106 reflected from the pitched ball has risen to a useful amplitude by time 1101, at −0.250 seconds, as may be seen in the expanded plot of this region seen in FIG. 11c. Useful data collection may continue through at least time 1102, at −0.040 seconds, as may be seen in the expanded plot of this region seen in FIG. 11d. Loss of range rate from cosine effect is clearly manifest in the increased wavelength seen in FIG. 11d, compared with FIG. 11c. For simple data extraction methods, such as a zero-crossing measure of cycle-times method, useful data may lie in those intervals wherein the signal to noise ratio remains high enough for long enough to collect a sequence of, for instance, 30 cycle times, without noise concealing or adding zero crossings. In alternative embodiments, a more powerful microcontroller chip may be employed, and Fourier methods may be used to extract useful Doppler data through regions of poorer signal to noise ratio than may be possible with zero-crossing detection. Useful Doppler data burst 1106 is typically followed by a brief period 1107 during which the traveling ball has fallen out of the field of view of the transducers. Impact of the ball upon the face of pitching trainer 101 produces noise burst 1105 in the Doppler channel, as well as burst 1104 in the notched baseband channel. While time-of-impact might also be determined from burst 1105, such a determination may be complicated by the fact that gap 1107 may be absent, and Doppler data 1106 may have risen to saturation levels, on certain pitches that never move out of the transducer's field of view, such as those that directly strike protective mesh 110. In one embodiment, the ball/strike distinction may be made from an analysis of the relative time evolution of higher versus lower frequency sounds in impact noise burst 1104.

Figure 12:
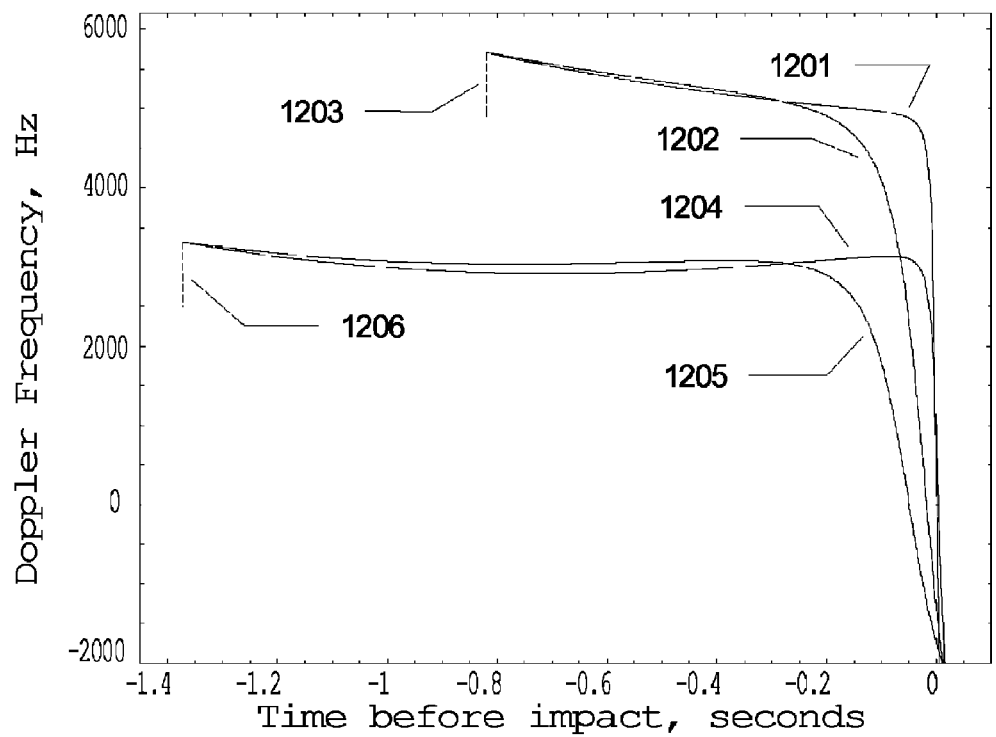
FIG. 12 illustrates the time course of Doppler signals that may be encountered in using the method of the invention to determine the speed of a baseball.

FIG. 12 may be used to illustrate some difficulties that must be dealt with in calculating an accurate pitch release speed from limited Doppler data. The curves plotted represent detailed numerical simulations of four illustrative pitches. Each curve presents all acoustic Doppler range-rate data that could in principle be captured by ideal omnidirectional equipment, with the horizontal axis representing time before impact, and with the vertical axis representing the upward shift of a 40 kHz emitter sound as reflected from the ball. Note that in general herein, the terms "Doppler frequency" and "Doppler value" may be taken to be the change in frequency of a reflected wave from the frequency emitted. Curves 1201 and 1202 represent pitches released at 50 MPH at time 1203, while curves 1204 and 1205 represent pitches released at 30 MPH at time 1206. Curves 1201 and 1204 represent high pitches, striking near the top of backstop curtain 106, while curves 1202 and 1205 represent low pitches, striking near the bottom. All four pitches are released at a distance from the target typical for a 60'6" pitching rubber. The definition of release speed as the usual user wishes to measure it comprises the horizontal component of the pitch at release time, along a line straight toward the plate. This is the speed that will be registered by a high-quality radar gun, used properly and under good conditions from a spot directly behind home plate. If fully reliable or inexpensive Doppler equipment, such as entailed in the invention, were able to capture the Doppler frequencies immediately present at times 1203 and 1206, accurate pitch speeds might be computed from these without further correction. As practical and inexpensive equipment may not be able to gather data until much later points in a pitch trajectory, however, the time evolution of the ball speed may be considered. In particular, the evolving range-rate component of the ball speed may be considered, as this will correspond to the data actually available. The following effects in the evolution of measured range-rate may be observed in FIG. 12:

1. In a first effect, the loss of ball speed due to air drag is clearly visible in 50 MPH curves 1201 and 1202. It is also important in 30 MPH curves 1204 and 1205, but is there overweighed and masked by a speed-of-descent effect, discussed next.
2. In a second effect, the lob-like pitches 1204 and 1205, thrown at only 30 MPH, are seen to show a range-rate that actually increases at points approaching the target. This is caused by the gathering downward speed of a ball on a descending arc. When the ball is first released, the range-rate measuring device may and should be at a height similar to the release height. Given the relatively large horizontal distance, a range-rate obtained at release time will, as desired, be little affected by any upward component to the release speed. By the time this reverses to a downward component, however, the ball may lie at a substantial angle above, and later below, the range-rate measuring device. This substantial angle converts the vertical component of velocity into something that affects the range-rate, further complicating accurate release speed measurement. In the case of high pitch 1204, this speed-of-descent effect causes late range-rate measurements to be elevated. In the case of low pitch 1205, the speed-of-descent effect causes the very late range-rate value to be depressed, becoming, in fact, significantly negative by the time of impact. Curves 1204 and 1205 have been plotted for low speed lobs so that the speed-of-descent effect may be visually obvious; the speed-of-descent effect, however, is present in the proximal range-rate data for pitches of all speeds.
3. In a third effect, all four pitch-curves may be seen to manifest a strong cosine effect drop-off before impact. For pitches that strike very close to range-rate sensors—in this case, high pitches—the effect may become significant only well after the range over which good data may first be collected. For most pitches, however, cosine effect must be accounted for in proximally measured data.

It is to be understood that the phenomena exhibited in FIG. 12 have exact counterparts for all speed measuring methods that depend upon range-related data, including, but not limited to, acoustic and radar Doppler methods.

Figure 13:
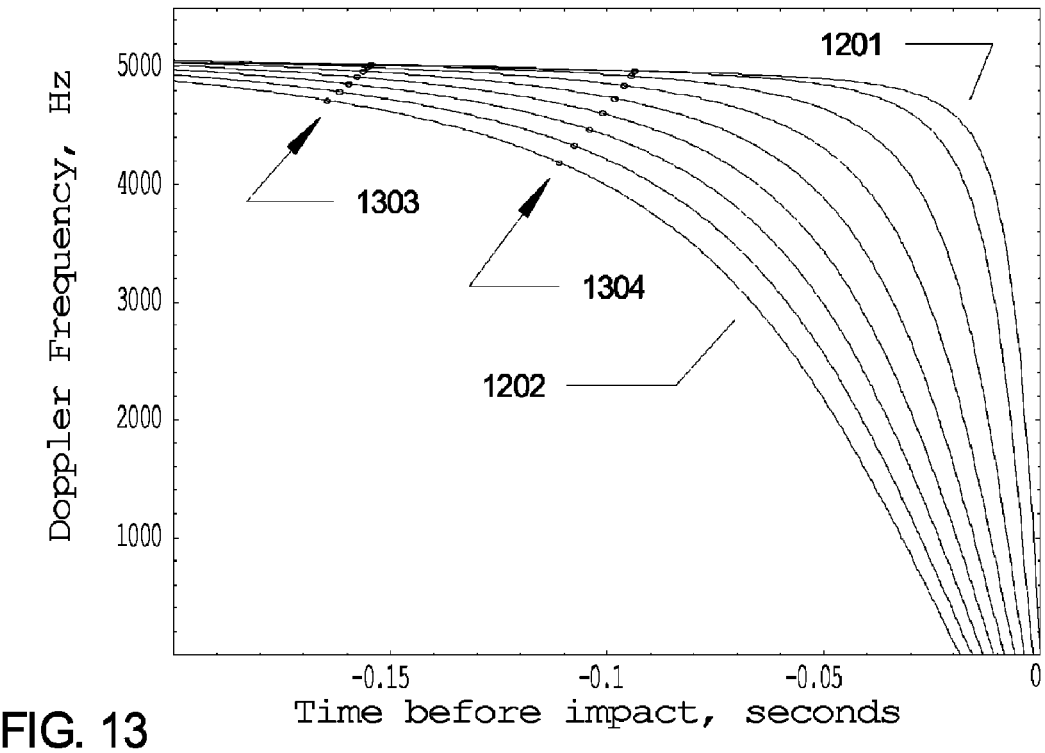
FIG. 13 further details aspects of the illustrative signals of FIG. 12, along with specific points relevant to an embodiment of the method of the invention.

Turning to FIG. 13, the later portions of pitch curves 1201 and 1202 are re-plotted, along with curves for other pitches of the same horizontal release speed, but with differing initial vertical components. These result in intermediate impact heights on the target, spaced by impact height intervals of about 6½ inches. The horizontal axis of FIG. 13 spans a duration of 0.2 seconds prior to impact. For a 50 MPH pitch, this is approximately the time over which a device in accordance with the embodiment illustrated in FIGS. 1-10 may be expected to find valid Doppler data. It may be noted, though, that data corresponding to the lower right area of FIG. 13 may not be available, as the ball may have passed below the sensing field of view in this region. A far point and a near point on any given trajectory may be selected for special attention to the range-rate data. Thus far points 1303 may be selected such that the product of the time prior to impact, times a range-rate computed from the corresponding Doppler frequency, is 10 feet. Similarly, near points 1304 may be selected such that this product is 6 feet. A product of a range-rate times a time to impact may be termed a "range-rate distance". While range-rate distances correspond precisely to neither distance-to-target nor distance-to-sensors, they constitute a useful approximation that is reproducible and simple to compute. Notice that the Doppler value of the far point of curve 1202 is substantially higher than for its near point, whereas the two values are almost equal for curve 1201. This suggests that augmenting the far point Doppler value by some function of the excess of the far value over the near, may provide a corrected Doppler value that is invariant with pitch height, and dependent only upon release velocity. We know then that a second function must exist that relates the desired release speed to this corrected Doppler value, and that a composition of the functions must yield a single function deriving the desired release speed from the far point Doppler value and the near point Doppler value. Furthermore, by developing an empirical realization of this function from full and realistic pitch data, a single practical function may be derived that simultaneously and successfully deals with at least the three confounding effects enumerated above. For brevity, a combination of a far point Doppler value and a near point Doppler value, developed for use as described here, may be termed a "far-near pair".

The relatively simple method for selecting far points and near points just described has the advantage of looking for data at distances from the target that are reasonably independent of pitch velocity. Since there may be some unpredictable variation in data quality over short time intervals, it can be beneficial to have a second correction function available for use with a second set of nominal far point and near point distances, such as a nominal far point distance of 8 feet and a nominal near point distance of 4.7 feet. In other embodiments, other methods may be employed for selecting far points and near points. One approach may define two constant pre-impact times, and choose points for all trajectories at these times. For very fast pitches, however, such a method may select times when the ball is still so far from the target that good data are not yet available. Conversely, for very slow pitches, one fixed set of near and far point times may look for data from positions too close to the target. Multiple time pairs may be employed as a solution to this.

The Doppler value at a prespecified range-rate distance may be determined from measured data in a number of ways. The simplest may be to choose the Doppler value of that available data point having a range-rate distance closest to that desired. If data are free enough of noise and densely spaced in time, this method may suffice to assign Doppler values to a far-near pair. More precise results may be attainable by interpolating between the pair of points most closely bracketing the desired range-rate. Alternatively, more sophisticated methods may be employed to achieve more optimal results from limited and noisy data.

Conceptually, the goal is to fit the available data with an expected range-rate curve generated from the fewest possible free parameters. The desired characteristic of the trajectory, in this case the horizontal release speed, may then be computed from the parameters of the fit. Since only the final result is sought, there is great freedom in the way in which the parameters may be represented. For the purposes of the embodiment illustrated in FIGS. 1-10, a two-parameter fit has been found effective. A first function, for instance, may be chosen that represents the two parameters as Doppler values at range-rate distances of 10 feet and 6 feet. This choice then determines the form of the second function, which computes release speed from these values. Both of these functions may be evaluated with limited computational resources. Alternatively, the two parameters may be chosen as the horizontal and vertical components of ball velocity at release time, and the first function may comprise repeated full numerical simulations of the resulting trajectory and its expected Doppler values, until the parameters have been adjusted to achieve best fit to the data. In this instance, the second function need merely select and return the first stated parameter of the fit, discarding the other. This alternative approach may offer optimal use of data, but at the expense of great computational demands. There are many other possible applications of methods implemented according to embodiments of the invention, involving various representations, and various trade-offs between computational simplification and approximation on the one hand, and optimality of data use on the other. It is understood that all such applications fall within the scope of the claims.

A Particular Embodiment Requiring Little Computational Power

A particular application of a method implemented according to an embodiment of the invention will now be detailed. This both serves as a specific example of the more general principles, and illustrates how they may be applied in a system with limited computational resources.

Figure 14:
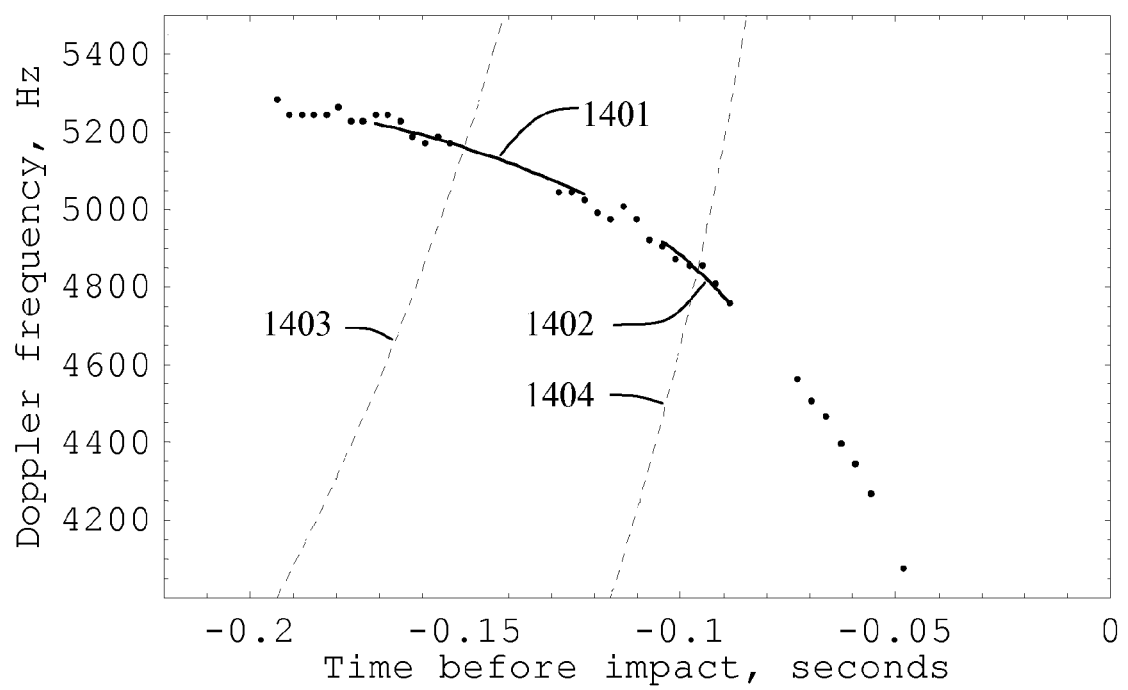
FIG. 14 depicts the application of aspects of the method of the invention to typical data gathered in accordance with the method of the invention.

FIG. 14 presents illustrative Doppler data from an actual pitch, gathered with the techniques described above. Also plotted are certain curve segments, computed from these data in the course of deriving a far-near pair. Segment 1401 represents a quadratic curve, or second-degree polynomial of time, that has been fitted under constraint to a set of data points that may be termed the "far set". The points of the far set may be all those with a range-rate distance falling between 8 feet and 11.5 feet. Segment 1401 is a particular example of what may be termed a "far segment"; in this case, one that has been optimized. Similarly, segment 1402 represents a quadratic curve that has been fitted under constraint to a "near set" of data points. The points of this near set may be all those with a range-rate distance falling between 5 feet and 7 feet. Locus 1403 represents all possible point positions with a range-rate distance of 10 feet, while locus 1404 represents those with a range-rate distance of 6 feet. The immediate goal is to determine, as accurately as possible, the Doppler frequencies at which locus 1403 and locus 1404 intersect the true Doppler curve of the pitched trajectory. Now, an unconstrained second-order curve is determined by three constants: an offset, a multiplier of the time variable, and a multiplier of the time variable squared. For the two segments 1401 and 1402, then, there are a total of six such constants. All six, however, may themselves be computed from the same two Doppler frequencies that we seek, thus constraining the fit back to only two parameters. Starting with only crude approximations to these, we may then perform an iterative process of refinement that very rapidly converges to its best estimate.

We may represent a far-near pair as:

{{tFar, dopFar}, {tNear, dopNear}}

Where the first member represents the current best estimate of the far point. This is itself a pair, comprising "dopFar", the current best estimate of the Doppler frequency of the far point, and "tFar", the current best estimate of the time, relative to impact, that the ball passed this point. "dopNear" and "tNear" may be analogously defined for the second member, representing the current best estimate of the near point. Letting "t" vary over the time span found among the data points of the far set, we may, as follows, estimate the expected Doppler value "dopval" as a function of "t" over this limited domain:

$$dopVal = dopfar * [1 + Cf1*(t-tFar) + Cf2*(t-tFar)^2] \quad \text{Equation 1}$$

Where Cf1 and Cf2 are coefficients as computed below.

Similarly for the near set, we may approximate the Doppler curve as:

$$dopVal = dopNear * [1 + Cn1*(t-tNear) + Cn2*(t-tNear)^2] \quad \text{Equation 2}$$

The following equations have been found to closely estimate the required coefficients:

$$Cf1 = [Kf1 + Kf2(1-dopNear/dopFar)]/tfar \quad \text{Equation 3}$$

$$Cf2 = [Kf3 + Kf4(1-dopNear/dopFar)]/tFar^2 \quad \text{Equation 4}$$

$$Cn1 = [Kn1 + Kn2(1-dopNear/dopFar)]/tNear \quad \text{Equation 5}$$

$$Cn2 = [Kn3 + Kn4(1-dopNear/dopFar)]/tNear^2 \quad \text{Equation 6}$$

Note that the four coefficients must be computed afresh for each cycle of estimation of each pitch, whereas the newly introduced values "Kf1" through "Kf4" and "Kn1" through "Kn4" represent fixed, pre-computed constants that are set by the details of the hardware and firmware design. At design time, these eight constants may be adjusted to provide best results on measured and computed data, such adjustment being accomplished by any of a number of known methods of parameter estimation, or by hand cut-and-try. This latter is not as difficult as it might at first seem, as the problem tends to break into four sub-problems with little interaction: refining Kf1 and Kf2 to best construct the slope of the far segment; refining Kf3 and Kf4 to best construct the curve of the far segment; refining Kn1 and Kn2 to best construct the slope of the near segment; and refining Kf3 and Kf4 to best construct the curve of the near segment.

Returning to Equation 1, it may be seen that when t is equal to the current estimate of the far-point time tfar, the computed estimate of the matching Doppler value must be exactly dopfar, the current estimate of its expected far-point value. The effect of the terms dependent on t, then, is to provide the slope and curve of a line passing through the far-point estimate. This line may then be compared to the actual data points of the far set, which fall at varying times before or after the far-point estimate. In particular, substituting for t the actual time of measurement of each point in the far set, predicted Doppler values may be derived from Equation 1. These may then be compared with the corresponding measured Doppler values, and the squared differences accumulated as a measure of the error of this approximation of the far segment. The current estimate of dopfar may then be adjusted as necessary to minimize this error. One simple and effective minimization of error may be performed as follows: Let a sum of all the measured Doppler values in the far set be called "sumFar". After collecting a sum "sumFarFit" of all the Doppler values predicted for the far set by Equation 1, we may take:

$$dopFarImproved = dopfar * sumFarFit / sumFar \quad \text{Equation 7}$$

Employing "dopFarImproved" in Equation 1 will now yield a sum-of-predictions exactly matching the sum of the measured Doppler values. In one very simple step this provides an error minimization that is very close to least-square.

Similarly, we may take:

$$dopNearImproved = dopNear * sumNearFit / sumNear \quad \text{Equation 8}$$

To refine tNear and tfar we may take:

$$tfar = 10/V(dopFar) \quad \text{Equation 9}$$

$$tNear = 6/V(dopNear) \quad \text{Equation 10}$$

where the function V returns the feet/second range-rate that is equivalent to the Doppler frequency provided as its argument and where the far-point and near-point range-rate distances are taken to be 10 ft. and 6 ft. respectively. These adjustments simply enforce the requirement that the far point and the near point fall at their corresponding range-rate distances.

A practical computation may then proceed as follows:
1. Scan the available data points, computing the range-related distance of each, and thereby establishing the far set and the near set.
2. Total up the Doppler values of the far set as sumFar, and of the near set as sumNear.
3. As initial estimates of dopfar and dopNear, take the Doppler values of the two measured data points with the range-related distances closest to 10 feet and 6 feet.
4. Set tfar and tNear in accordance with Equations 9 and 10.
5. Use Equations 3-6 to establish current coefficients for Equations 1 and 2.
6. Employing Equation 1 for all points in the far set, and Equation 2 for all points in the near set, accumulate values for sumFarFit and sumNearFit.
7. Replace dopfar and dopNear with the improved values computed in accordance with Equations 7 and 8.
8. Repeat from step 4, if further improvement is required.
9. In accordance with Equation 11, below, calculate pitch release speed from the final values of dopfar and dopNear.

We turn now to the second function, which may calculate pitch release speed "releaseSpeed" from the two trajectory parameters dopNear and dopfar. It has been found that a polynomial that is third-degree in dopfar and second-degree in dopNear provides a close estimate:

$$releaseSpeed = A1*dopFar + A2*dopFar^2 + A3*dopFar^3 + B1*dopNear + B2*dopNear^2 + C \quad \text{Equation 11}$$

Again, the six constants—A1, A2, A3, B1, B2, and C—are precomputed, and are fixed by the hardware design, the intended conditions of use, and the way the two parameters provided describe the trajectory space.

In general, the derivation of an effective second function may begin by the collection of actual data with the device for which the computation is intended, under the intended conditions of use. These data may validate and be complemented by data generated by numerical simulation. Such simulation may require details of target and sensor location, projectile drag and drag-crisis characteristics, range of potential Magnus forces, intended flight distance, range of typical release points, operating frequency, and others. From a full range of required trajectories, typical data that are expected to be available in use may be prepared, and the true release speed of each data set matched with the trajectory parameters extracted by a previously established first function. The general form of a second function to compute the release speeds from the matching parameter values may then be proposed, and such constants as may be required to particularize this general form may be chosen to best fit the release speeds to the parameter determinations. If a very general functional form be used, such as a polynomial expansion, essentially all of the information in the fit may reside in the choice of these constant values. Such choices may be made automatically, using widely available software, such as the functions "FindFit", "Fit", and "NMinimize" found in Mathematica.

There is one further small simplification that may be made in the determination of dopfar and dopNear. In the name of expository clarity, this was not introduced earlier. The definition of tNear, and the parameter dopNear, may be modified as follows: with tfar defined and determined as before, tNear may simply be taken as a fraction, such a 6/10ths, of tfar. dopNear is then to be defined as the best estimate of the true Doppler value of the actual trajectory at this time. To effect this altered definition, Equation 10 is replaced by Equation 12:

$$tNear=0.6*tfar \qquad \text{Equation 12}$$

Also, the right sides of Equations 5 and 6 may reference tfar instead of tNear, and may employ different specific constant values:

$$Cn1=[Kn1'+Kn2'(1-dopNear/dopFar)]/tfar \qquad \text{Equation 13}$$

$$Cn2=[Kn3'+Kn4'(1-dopNear/dopFar)]/tfar^2 \qquad \text{Equation 14}$$

This somewhat modifies the values that will be computed for dopNear, and modifies slightly the way dopNear and dopfar together describe trajectories. In turn, this results in somewhat different constant values being found for use in the second function. Various fixed fractions of the tfar estimate may also be used as limits to establish membership in the far and near sets, rather than examining each point separately for its range-rate distance. It is these slightly modified definitions that are assumed and presented in the firmware description to follow.

Firmware Structure of One Embodiment

Figure 15:
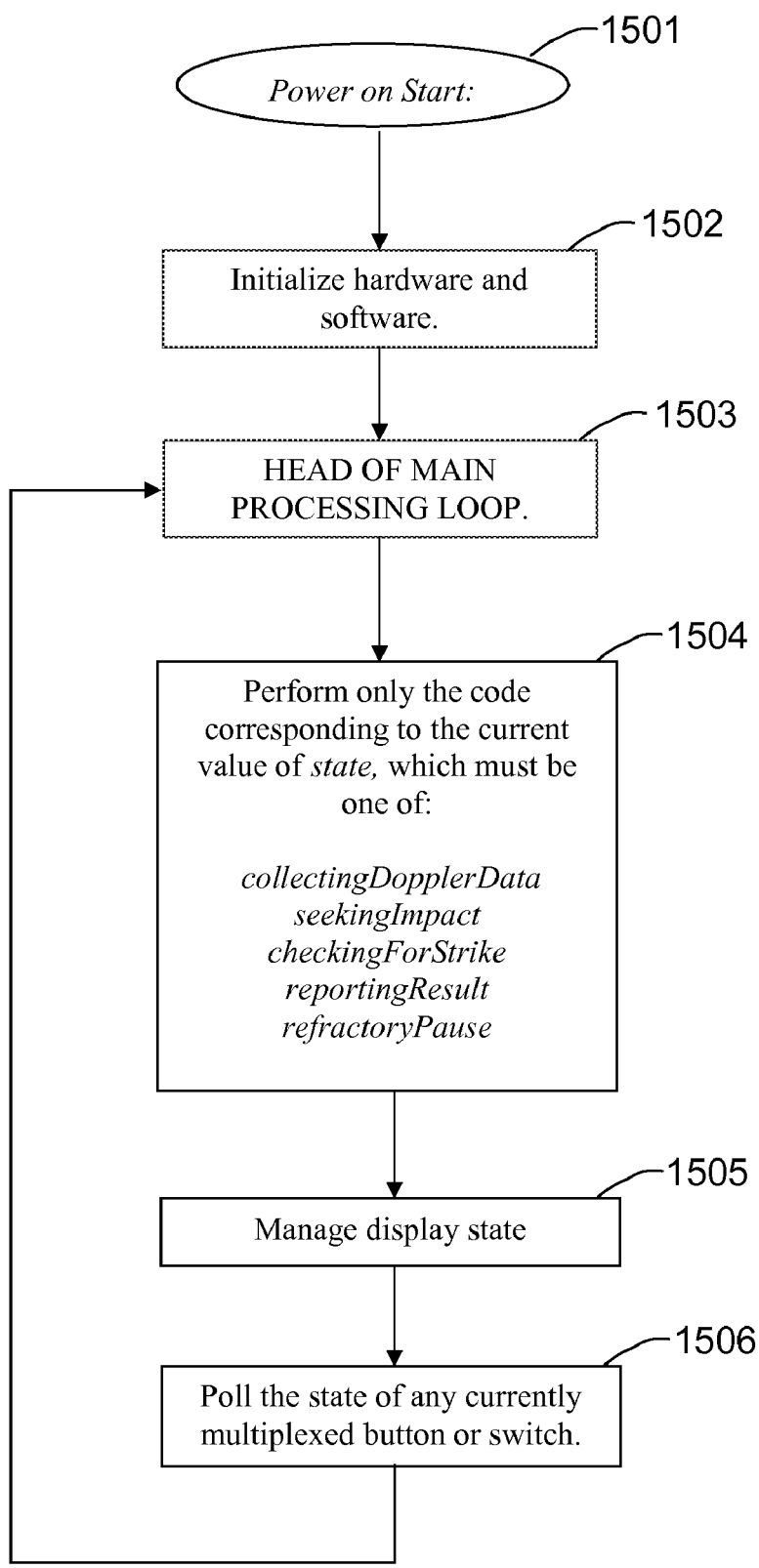
FIGS. 15-22 are flowcharts depicting software behaviors that may be employed to embody the method of the invention.

FIG. 15 depicts an approach to overall firmware structure that may be used in one embodiment of the invention. The power-on start condition, created by the engagement of power switch 308, leads to initialization routines 1502. A main processing loop, entered at 1503, comprises an input data task 1504 to handle the gathering microphone input data and the calculation of pitch characteristics, an output display task 1505 to control messages on the LED display, and an input button and switch task to monitor the states of operating switches 309 through 312. As events in these three tasks must overlap extensively in time, they may be implemented as state engines; that is, as tasks designed to retain more state-of-progress information in one or more explicit state variables, and less implicitly in the position of the program counter. This allows rapid entry-and-exit cycles, so that flow around the main loop may be repeated rapidly, interleaving the different task activities in time. Task 1504 comprises five major activities, performed in sequence in the course of each pitch registered by pitching trainer 101. During inactivity awaiting a pitch, and during the approach of a ball until shortly before impact, task 1504 in is state collectingDopplerData. This activity attends closely to the stream of A/D values being derived from Doppler signal 507, attempting to collect a continuous and plausible-looking history of Doppler-shift frequencies from whatever is being received. Activity collectingDopplerData is itself structured to execute incrementally, processing small segments of input data at a time, and releasing control quickly. Control very shortly re-arrives at task 1504, where variable state is examined. As this still contains a value denoting collectingDopplerData, this activity is resumed. When, after many repetitions, a point is reached such that plausible Doppler data is available, and there is indication that a ball impact might be immanent, the collectingDopplerData code assigns a value denoting the seekingImpact activity into state. It is then the seekingImpact activity that is executed upon the next and following passes through task 1504, until such time as state is again altered. The seekingImpact activity attends closely to the stream of A/D values being derived from notched baseband signal 405, awaiting an abrupt transition that indicates the loud impact noise. When this is detected, the seekingImpact code assigns a value denoting the checkingForStrike activity into state. The checkingForStrike activity continues monitoring signal 405, compiling information about the impact sound, as it continues to evolve over a short period. This information will allow the difference between a ball and a strike to be determined. When the necessary period for this has passed, the checkingForStrike code assigns a value denoting the reportingResult activity into state. The reportingResult activity processes the Doppler history and the impact sound data to derive the pitch speed and ball/strike determination. At this point, there is no longer critical real-time data to handle; therefore, the reportingResult code, in contrast to the other four states, may complete its full activity in one pass and set state to refractoryPause immediately. The refractoryPause state may serve a first purpose, which is to provide a minimal period during which a new pitch result may be stably displayed, as during this interval no acoustic data are attended to or processed. A second purpose may be to provide an opportunity to switch the A/D multiplexer to other channels of input, allowing housekeeping measurements of such things as battery voltage and ambient temperature. After many passes through, the refractoryPause code detects the elapse of sufficient time, and sets state to collectingDopplerData in to await the next pitch.

Display state task 1505 is concerned primarily with the orderly progression of desired messages on the display, as initiated by events signaled from tasks 1504 and 1506, and as then dictated by the passing of time. If no new pitch is detected within, say 4 seconds of a preceding pitch, task 1505 may change the two character arrays from the display of the last pitch speed, to a sequential recitation of such accumulated statistics as the total pitch count, strike count, ball count, number of "walks" and number of "outs". The number of walks may represent the number of times a four-ball count has accumulated before three strikes, and conversely for the number of outs, with the active strike and ball counts being maintained on LEDs 208, 209, and 210, and with these active counts being cleared when either strikes reach three or balls reach four. Each numerical statistic may be preceded by a two-character reminder and label for what follows, such as, for instance "PC" for pitch count, "S=" for the tally of strikes, "B=" for the tally of balls, etc. Each label or statistic may be presented for an appropriate short interval, such as ½ second, before progression to the next. When the sequence is complete, task 1505 may return the last pitch speed to the display, but enter a battery-conserving mode in which this value is only flashed briefly every couple seconds. If there continues to be no pitch activity, the recitation of statistics may be repeated at intervals. At any time a pitch is detected by task 1504, the display state may be reset to display the new data, interrupting any statistics sequence.

There is a further, high-frequency display activity which must be steadily maintained. This comprises the advancement of the states of the display drive lines C0 through C9 and R0 through R9. If implemented at interrupt level, low-level multiplexing of the display may be achieved on steady and reliable 1-millisecond intervals. Such interrupt-level code may examine communicating variables stored by task 1505 to represent the currently desired display characters and balls/strikes/outs display. Since techniques of interrupt-driven activity are well understood in the art, opportunities for their effective use will be here noted in passing, but not detailed in flowcharts.

Switch monitoring task 1506 may maintain an image of the current switch and button states in continuously readable variables, and may signal switch and button transition events. Switch 312 may be employed to select an expected distance to the pitching rubber of 46 feet or 60 feet. This setting may then be used to choose the appropriate set of precomputed constants for pitch speed calculations. Switch 311 may be employed to select baseball or softball. Selection of softball may activate the application of an additional drag correction in calculating speed. Switch 310 may be used to select between two different sets of running statistics, such that a player #1 and a player #2 may alternate turns and be able to compare and compete. Changing the state of any of these switches may trigger special sequences to be displayed by task 1505, such that the user is prompted at such time as to which distance, ball type, and player are currently selected. Such a prompt sequence may also be triggered at power-up. Pushbutton 309 may be used to manually add to the ball count when a wild pitch has entirely missed the pitching trainer.

Figure 16:
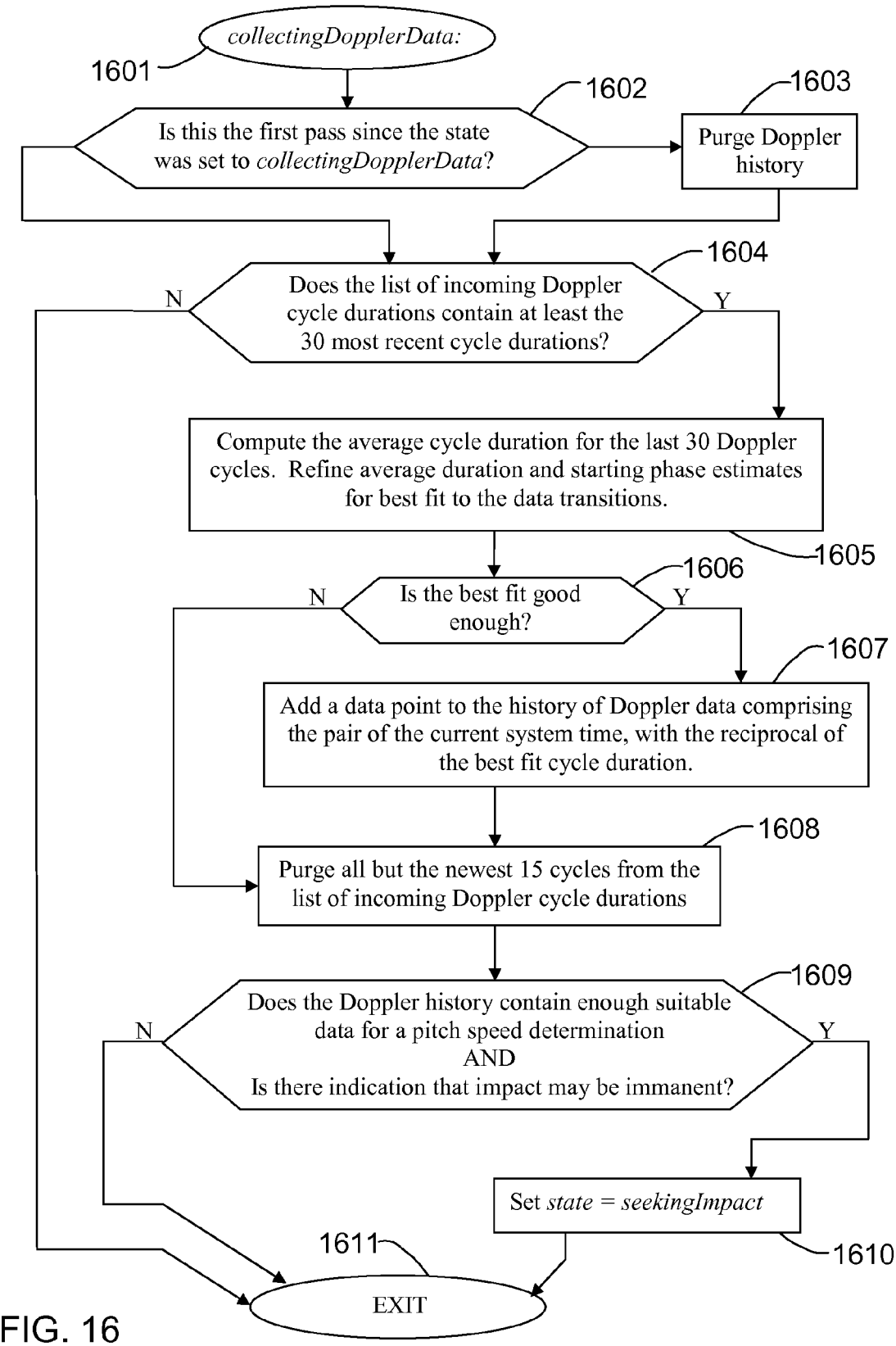

Turning to FIG. 16, the code to conduct activity collectingDopplerData is entered at 1601 and exited at 1611. This is the whole code executed by task 1504 when it is entered with state=collectingDopplerData. On the first pass through, detected at 1602, previous Doppler data is purged at 1603. In decision 1604, the length of the accumulating list of the incoming cycle lengths is examined, and if it is less than the number desired for a Doppler frequency determination, an immediate exit may be taken at 1611. The list of incoming cycle lengths is preferably added to by a small routine at interrupt level, which examines each successive A/D value for Doppler signal 1507. The interrupt routine may be triggered by the completion of conversions, and may count the cycle widths in terms of the number of conversions between sign transitions from negative to positive. A running count of all conversions may also be maintained as the system time.

If there are sufficient cycle widths for a Doppler determination, computation 1605 attempts to characterize these values with a single precise cycle width, as should be possible from input dominated by a sine wave of consistent frequency. While the Doppler signal sought will in fact be changing in frequency, this change will be too gradual to be significant over a small sequence of cycles. Computation 1605 may match the actual input transition times, as accumulated from successive widths, with a perfectly even sequence as predicted from a best-fit single width and starting phase. If the error in predicted transition times is seen small enough at 1606, the best-fit single width, and a system time characterizing it, may be a point entered into a list constituting the Doppler history. Whether or not a good Doppler value has been found from this cycle data, the older half of it may be discarded at 1608. This prepares for the next assessment of the cycle-width list to use half new data, and half old. Purging less than the entire list may improve the fraction of erratically noisy data that is able to contribute to good Doppler points.

At 1609, features of the developing Doppler history are examined. Points that are outliers in value or widely isolated in time may be discarded. If an increasing cycle width has been followed by a loss of ongoing data, this may be taken as a sign that a pitched ball has dropped below the Doppler field-of-view and that impact is immanent. If the signal amplitude of good data has grown very high, this may be taken as a sign that impact is immanent in the vicinity of the protective mesh window. Then if there is such a sign of possible immanent impact, and if there are at least, say, 9 good Doppler points in the history, state may be advanced to seekingImpact at 1610. Otherwise, collectingDopplerData will continue to look for sufficient good pitch data.

Figure 17:
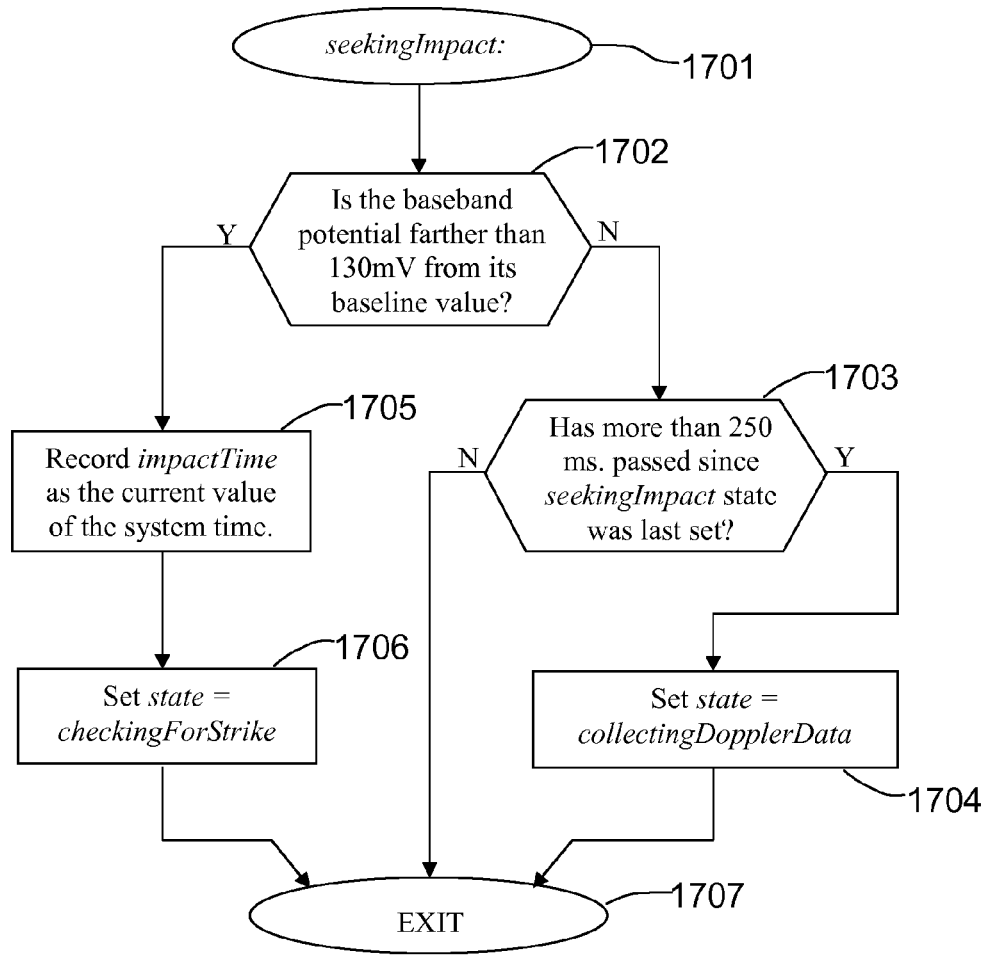

FIG. 17 depicts the seekingImpact activity, entering at 1701 and exiting at 1707. The seekingImpact activity attends to notched baseband signal 405, which is captured at a low sensitivity level showing little activity until impact. During the wait, control passes repeatedly through decisions 1702 and 1703 directly to exit 1797. Should the pitch miss the target altogether, the timer examined in decision 1703 will expire, leading at 1704 to a state transition directly back to collectingDopplerData. Thus such a complete miss will not register on pitching trainer 101, although the user may press pushbutton 309 to record the pitch as a ball. If an appropriate threshold is detected at decision 1702, the system time of the impact may be noted at 1705, and state advanced to checkingForStrike at 1706.

Within the scope of the method of the invention, many different choices may be made in the materials, form, or construction of distinct target areas, so as to render distinctive acoustic signatures to the impact of a sports projectile. In the particular application of the invention to the embodiment illustrated in FIGS. 1-10, it may be a two-way distinction between balls and strikes that is to be performed. More particularly, the sound of impact may be augmented in the strike zone area by thin sheet of polycarbonate plastic 107, suspended just in front of backstop curtain 106. The augmented sound of a strike may be particularly distinguishable from the unaugmented sound of a ball during a brief delayed period after impact, such as a period from 15 to 30 milliseconds after impact. During this period, energy near 2 kHz may be enhanced following a strike, and the ratio of signal in this vicinity to signal near 700 Hz may provide a strike score number that is independent of ball speed and overall impact loudness.

Figure 18:
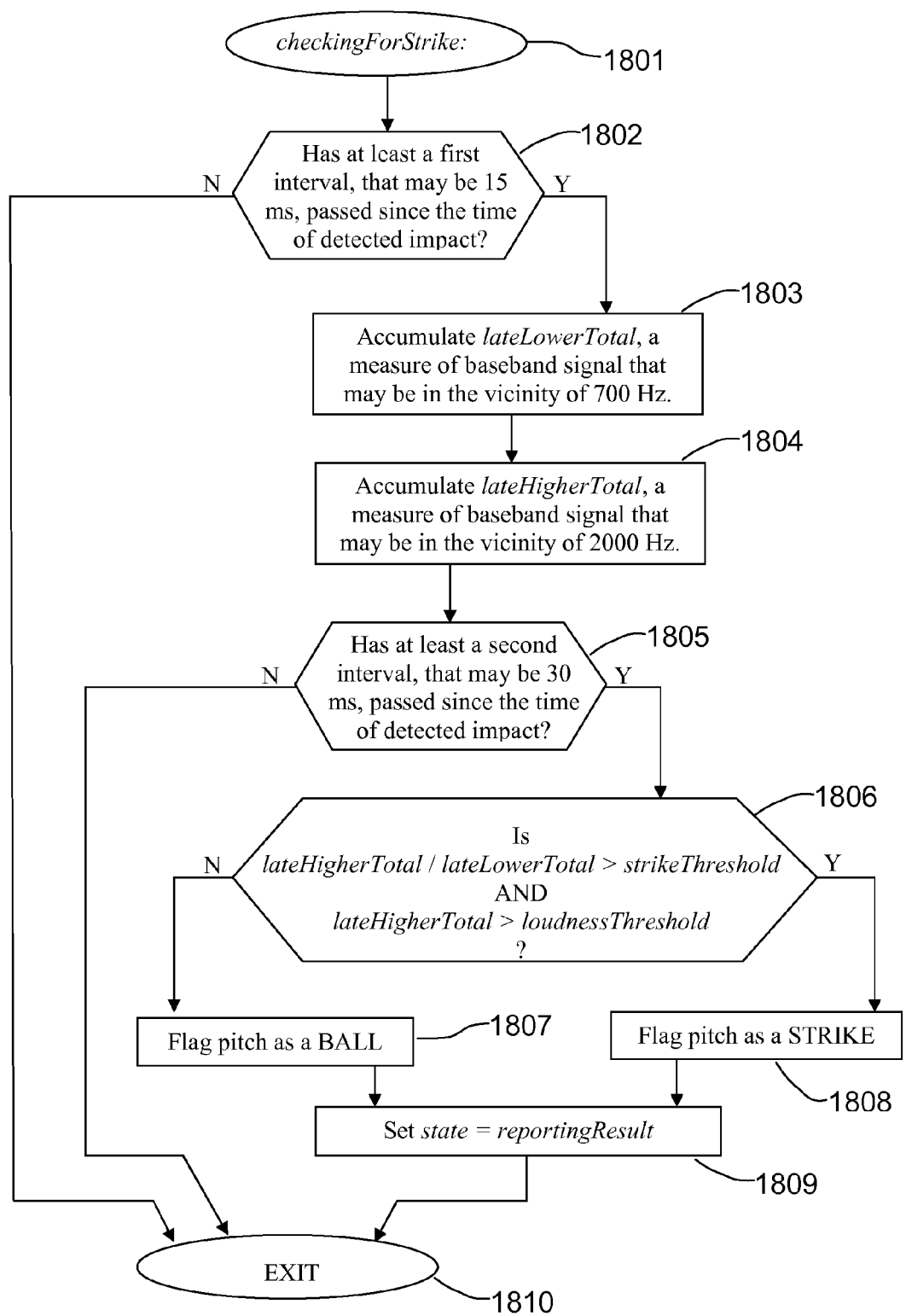

FIG. 18 depicts the checkingForStrike activity, entering at 1801 and exiting at 1810. The effect of decisions 1802 and 1805 is to isolate a period from 15 to 30 ms after impact for analysis of notched baseband signal 405. During this period, computations 1803 and 1804 develop measures of the total activity in lower and higher frequency bands respectively. At the completion of the measurement period, if the higher frequency activity is seen to be great enough for a plausible strike, and if it lies in high enough relation to the lower frequency activity, then decision 1806 may lead to the recording of the pitch as a strike at 1808. Failing this, the pitch may be recorded as a ball at 1807. In either case, the state is then advanced to the reportingResult activity at 1809.

In one embodiment, the measures of lower and higher frequency activity may be accomplished as follows: The A/D sampling rate may be 48 kHz. As each sample becomes available, it may be summed separately into variables lowSum and highSum, and variables lowCount and highCount may each be incremented. When lowCount is found to have reached 25, the value of lowSum may be compared with a value previousLowSum, and the absolute value of the difference accumulated into a value lateLowerTotal. previousLowSum may then be set to lowSum, and lowSum set to zero. During the processing of each sample as it arrives, the value of highCount may also be examined, and if found to have reached 8, a similar set of operations may be performed to accumulate a value lateHigherTotal. The values of lateLowerTotal and lateHigherTotal accumulated by the end of the measurement period may then correspond, roughly but adequately, to the signal level in broad bands of frequencies peaking just over 700 Hz and just over 2 kHz, respectively. The computations just described entail acceptable compromises in accuracy of data use, in exchange for low computational demand. A further accommodation to possible speed limitation in processing may be made by performing at interrupt level the computations just described, representing the actions of code blocks 1803 and 1804. The portion of the checkingForStrike code invoked from main loop task 1504 may then monitor the results of these computations coming from interrupt level, and act on them as shown at 1806 to 1810. In this fashion it becomes less disruptive of measurement accuracy should code execution time between an exit at 1810 and reentrance at 1801 exceed one A/D sample time, as there may then be no overrun losses.

In certain embodiments, it may be desirable to use such dimensions and construction of frame 104 that the impact of a baseball on the frame may produce sounds similar in certain characteristics to those of an impact on target sheet 107. To prevent any such impact from registering as a strike, the parameters of the processing described above may be optimized to respond to such frame impacts as balls. An alternative embodiment, however, may include an additional sensor within electronics module 102. "Piezo benders" of known and inexpensive design are widely available. In addition to their typical use as acoustic emitters, they may also serve as sensitive vibration detectors. Such a device may be mounted to MCU board 304 so as to respond to vibrations of a few kHz in frequency passing to the module through mounting strap 103. Such vibrations may be present in substantial degree in the first few milliseconds following impact of a ball on frame 104, and absent after any impact confined to target sheet 107 or backstop curtain 106. Such vibrations may be detected, for example, if such an additional vibration sensor is connected between circuit ground and the center of divider 703. The firmware may then continue to use the DC value of the signal from divider 703 as a battery voltage indication, while checking for rapid fluctuations in this signal immediately after an impact is detected. If any such fluctuations are detected, the pitch may be reported as a ball. In this manner, the processing of the signal from microphone 306 may be optimized for distinguishing impacts on the two areas 107 and 106, based on their particular sound qualities only.

Figure 19:
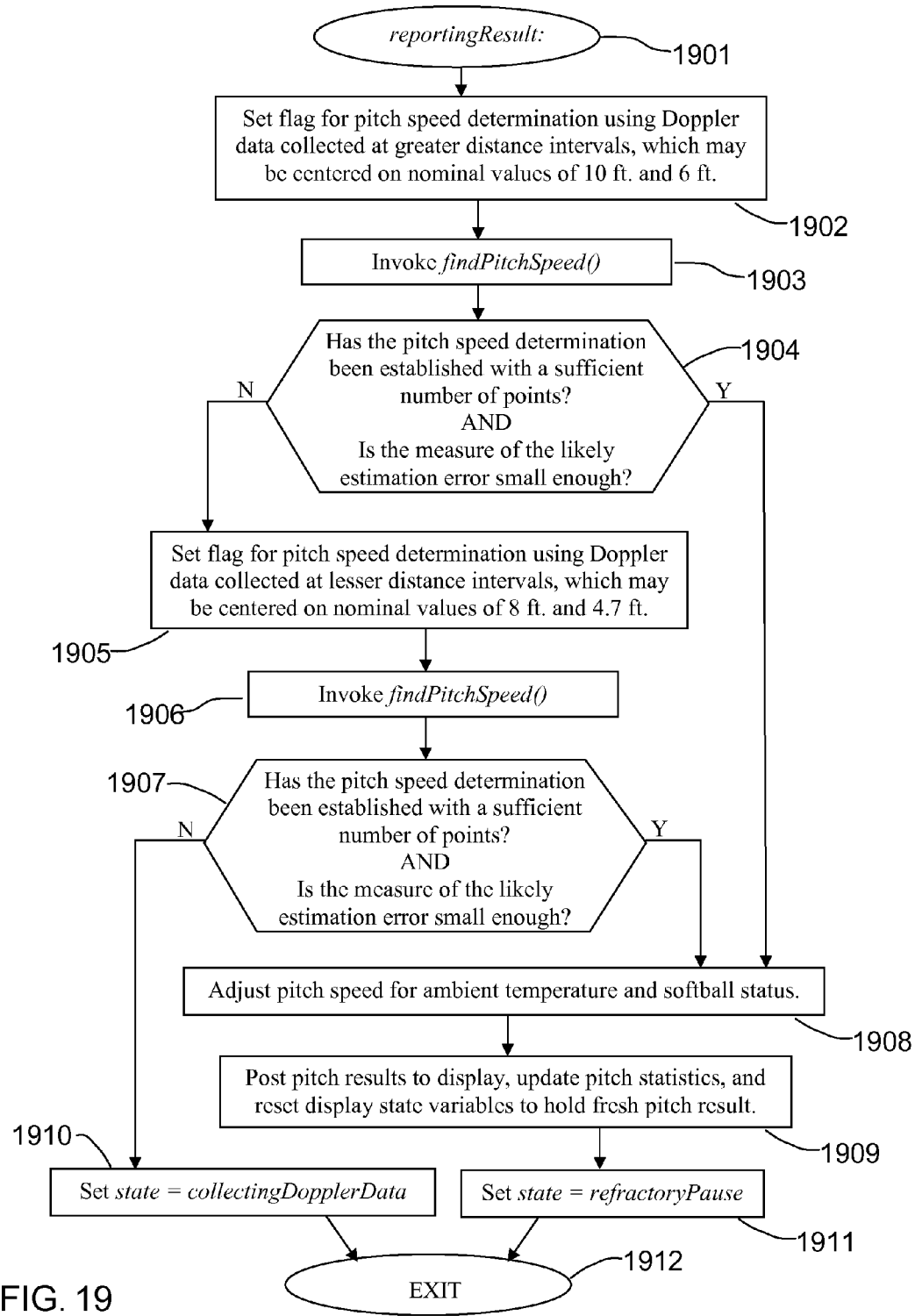

The actions taken in state reportingResult are detailed in FIG. 19. After entry at 1901, the first actions 1902 and 1903 are to invoke findPitchSpeed( ) for a calculation of pitch speed based upon seeking a more distant far-near pair. A decision at 1904 that this speed calculation has yielded a good result leads to the final reporting sequence starting at 1908. If the first attempt at a speed computation is found wanting, decision 1904 may lead to a repeat calculation, this time seeking a result from a closer far-near pair. If this is also found wanting, it may be preferable to ignore whatever has triggered the recognition of a tentative pitch event. Thus, decision 1907 may exit directly back to state collectingDopplerData via 1910 and 1912 should no adequate pitch speed determination be available. The final reporting sequence commences with adjustments at 1908 to the computed pitch speed. Since the speed of sound in air rises about 1% for each 10° F., a corrective scaling may be applied here, if a measure of ambient temperature is available. Since a softball has a higher ratio of drag to mass than does a baseball, a slight upward scaling of computed pitch speed may be applied here if switch 311 is set for softball. In an alternative embodiment, separate sets of constants may be optimized for softball pitches, and stored for use by findPitchSpeed( ) when softball pitching is selected. The actions at 1909 communicate pitch results to the display task and tally desired statistics, after which the state is advance by storing refractoryPause to state.

Figure 20:
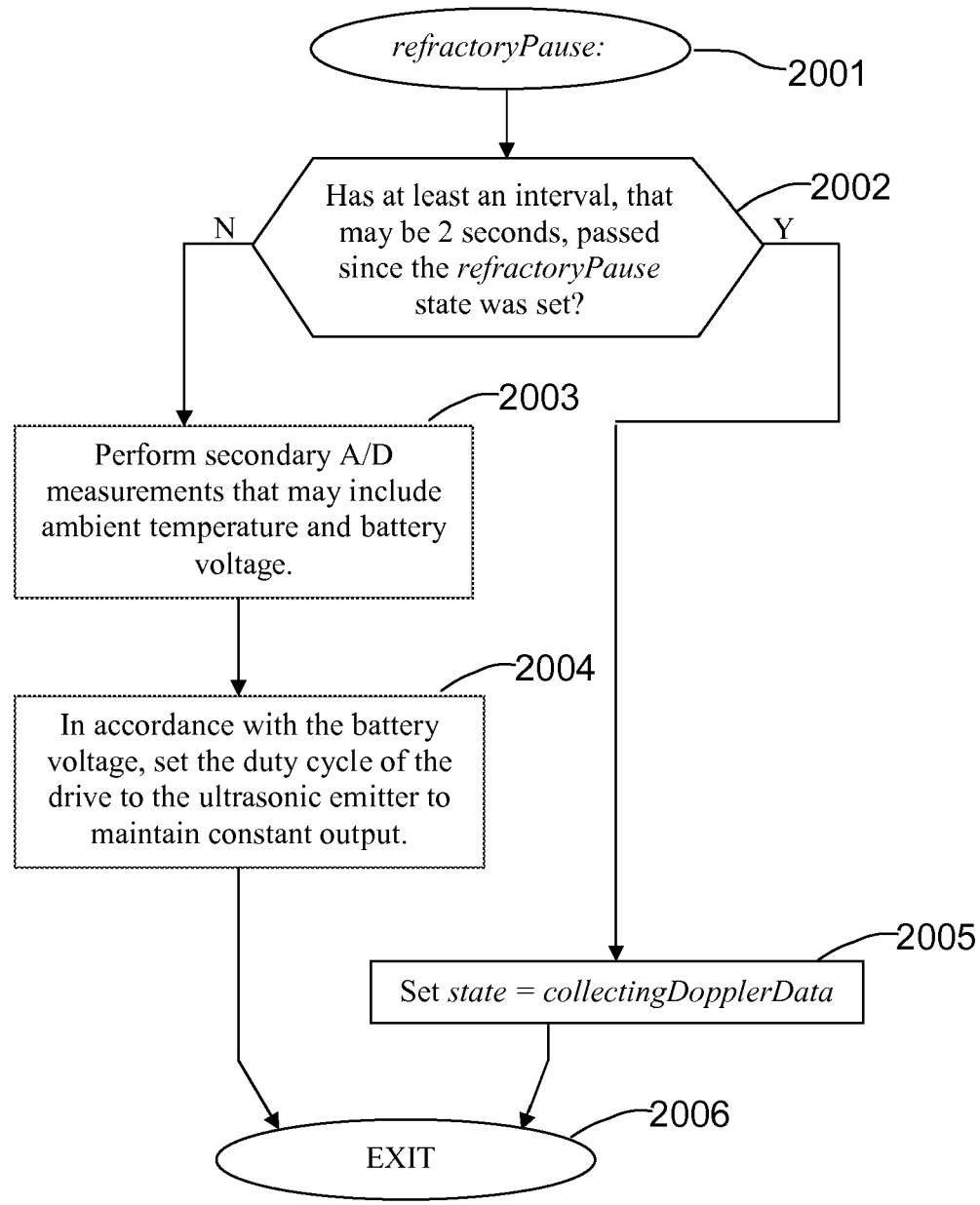

FIG. 20 depicts the refractoryPause activity, entering at 2001 and exiting at 2006. The refractoryPause activity may delay the return to state collectingDopplerData for a couple seconds after a pitch detection and measurement. During this time, certain housekeeping functions may be performed which might be disruptive of time-critical data gathering if performed at other times. Since it would make no sense for one pitch to follow another within, for instance, two seconds, it may be seen as advantageous to hold the results of any pitch long enough to guarantee that they may be seen. Measurement activities 2003 may comprise determination of average A/D measurements derived from circuits 702 and 703 for ambient temperature and battery voltage, respectively. Battery voltage may be employed at 2004 to adjust the duty-cycle of the emitter excitation, so that fresh batteries do not yield a substantially greater emitter power level than weak batteries. If emitter power level is allowed to vary too widely, returned signal may be weaker than necessary at the lower end of variation, whereas at the higher end there may be potential problems with amplifier saturation from protective mesh reflections, or even emitter overdrive damage. It may also be of concern that an abrupt change in drive level, even if relatively small, must generate a burst of sideband energy from the emitter, and so may be better not performed while gathering data. When decision 2002 eventually detects the expiration of the pause interval, the state is returned to collectingDopplerData at 2005.

Figure 21:
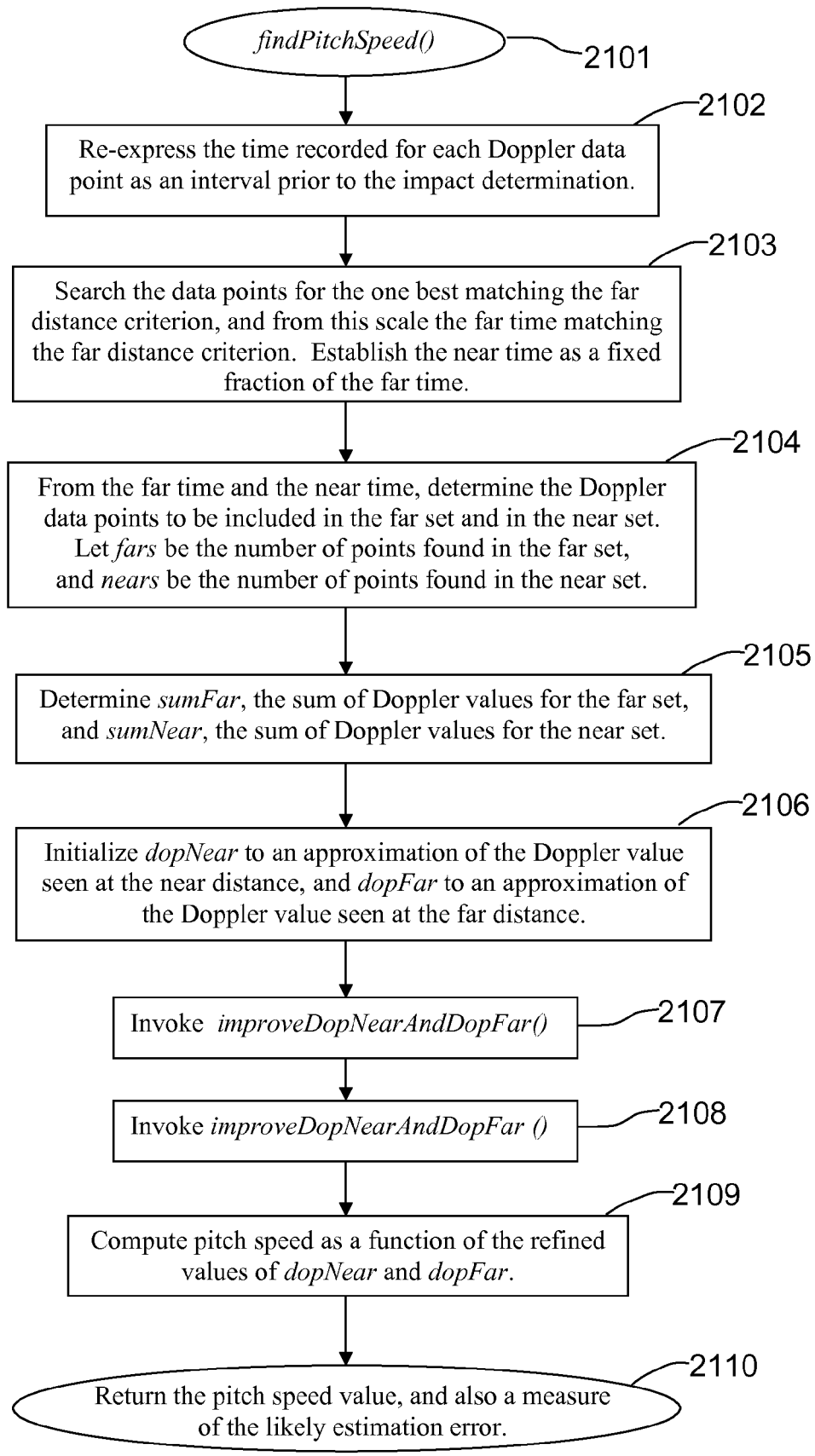
Figure 22:
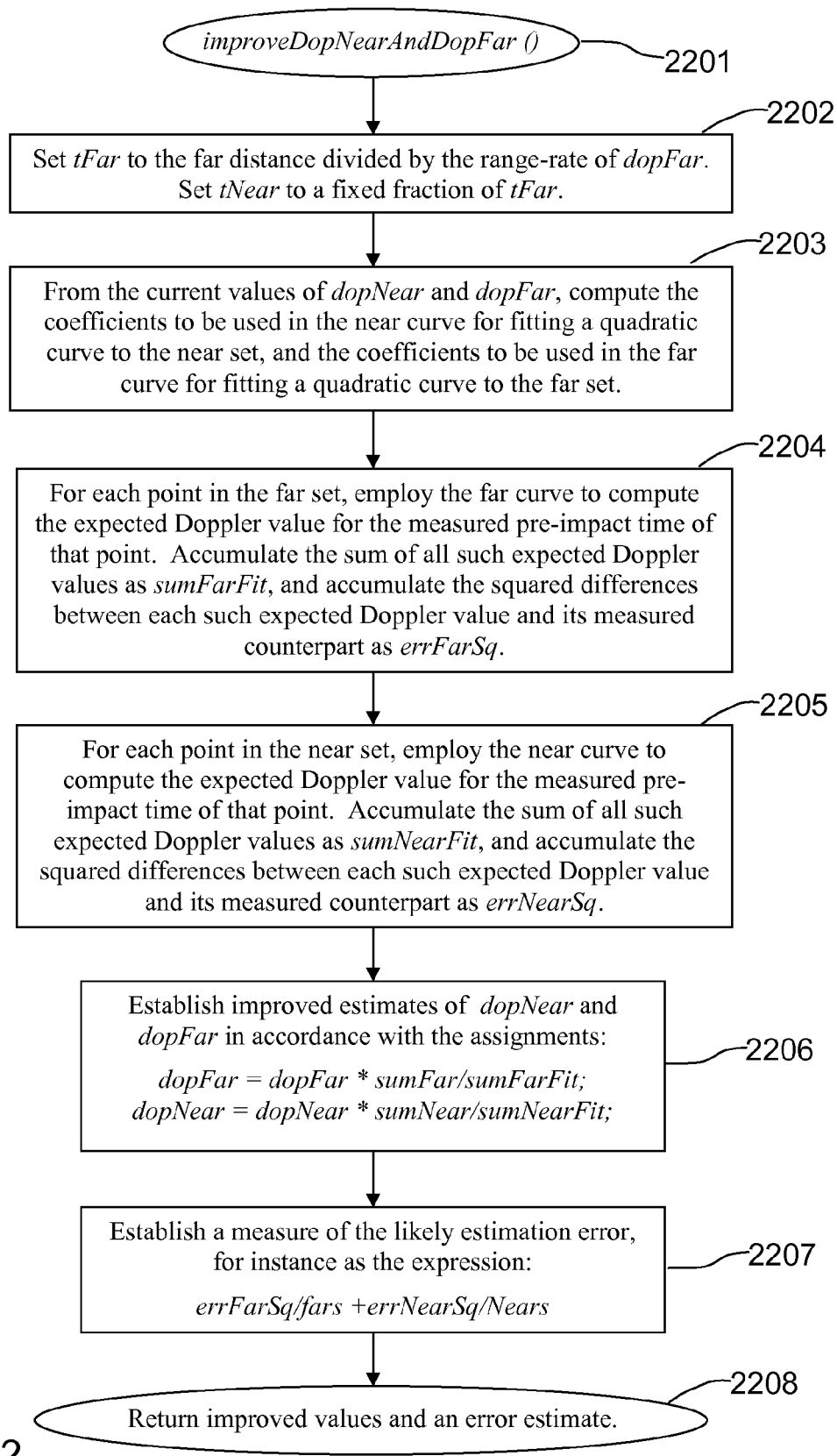

The routines findPitchSpeed( ), detailed in FIG. 21, and improveDopNearAndDopFar( ), detailed in FIG. 22, carry out the computational procedures described previously for deriving pitch speed.

The routine findPitchSpeed( ) is further detailed in FIG. 21. After entry at 2101, the system time determined for impact may be subtracted from the system times recorded for each of the Doppler values saved, thus expressing the Doppler points in terms of pre-impact time. Computations 2103 and 2104 accomplish the equivalent of step 1, as described previously. As also noted above, however, the procedure here has been modified to use fractions of an initial tFar estimate as surrogates for repeated calculations of range-rate distances. Calculations 2104 and 2105 correspond to step 3 and step 4, respectively, as described above, while the invocations of improveDopNearAndDopFar( ) correspond to passes through steps 4 through 7 as described above. As the rate of convergence for iterative improvement of the dopNear and dopFar estimates has been found to be very high in the embodiment illustrated in FIGS. 1-10, the iteration control expressed in step 8, above, may be accomplished simply by invoking improveDopNearAndDopFar twice, as seen at 2107 and 2108. Finally, action 2109 computes the actual pitch speed in accordance with Equation 11, as stated in step 9. Four different sets of the six constants employed in Equation 11 may be stored for subsequent use: one for use with 60-foot pitches and a 10-foot far point, one for use with 60-foot pitches and an 8-foot far point, one for use with 46-foot pitches and a 10-foot far point, and one for use with 46-foot pitches and an 8-foot far point.

The routine improveDopNearAndDopFar ( ) is further detailed in FIG. 22. After entry at 2201, actions at 2202 may correspond to step 4, as detailed above. At 2203, in correspondence with step 5, Equations 3 through 6 establish coefficient values for use in the segment fitting Equations 1 and 2. In some embodiments, separate sets of constants may be stored for use in Equations 3 through 6, such sets again corresponding to different contexts of usage, as with different pitch or far point distances. In application to the embodiment illustrated in FIGS. 1-10, however, it has been found that only a single set is needed. In part this is due to the essential lack of dependence of these values on pitching distance. In addition, judicious small adjustments of the fractions of tFar to which tNear is set in 2202 may render indistinguishable the constant sets needed for 10-foot and 8-foot far points. Thus to save on constant storage space, the value used in 2202 to set tNear from tFar may be 0.600 when using a 10-foot far point, but may be 0.588 when using an 8-foot far point. Computations 2204 and 2205 correspond to step 6, as described earlier, and computations 2206 correspond to step 7. Computations 2204 and 2205, however, may include additional steps to develop measures of the squared error of fit for each segment. In 2207, the average squared error per point for each segment may be added to form a single error measure for the overall fit.

Most of the data handled in microcontroller system 701 may be stored and manipulated in 8-bit or 16-bit integer form. The computation of pitch speed, however, may be more readily and reliably coded for 32-bit floating point. The computation as described herein, however, is efficient of operation count. Software floating-point operations based on 8-bit integer arithmetic may be used, completing a pitch computation in about 50 milliseconds.

Further Discussion

Figure 23:
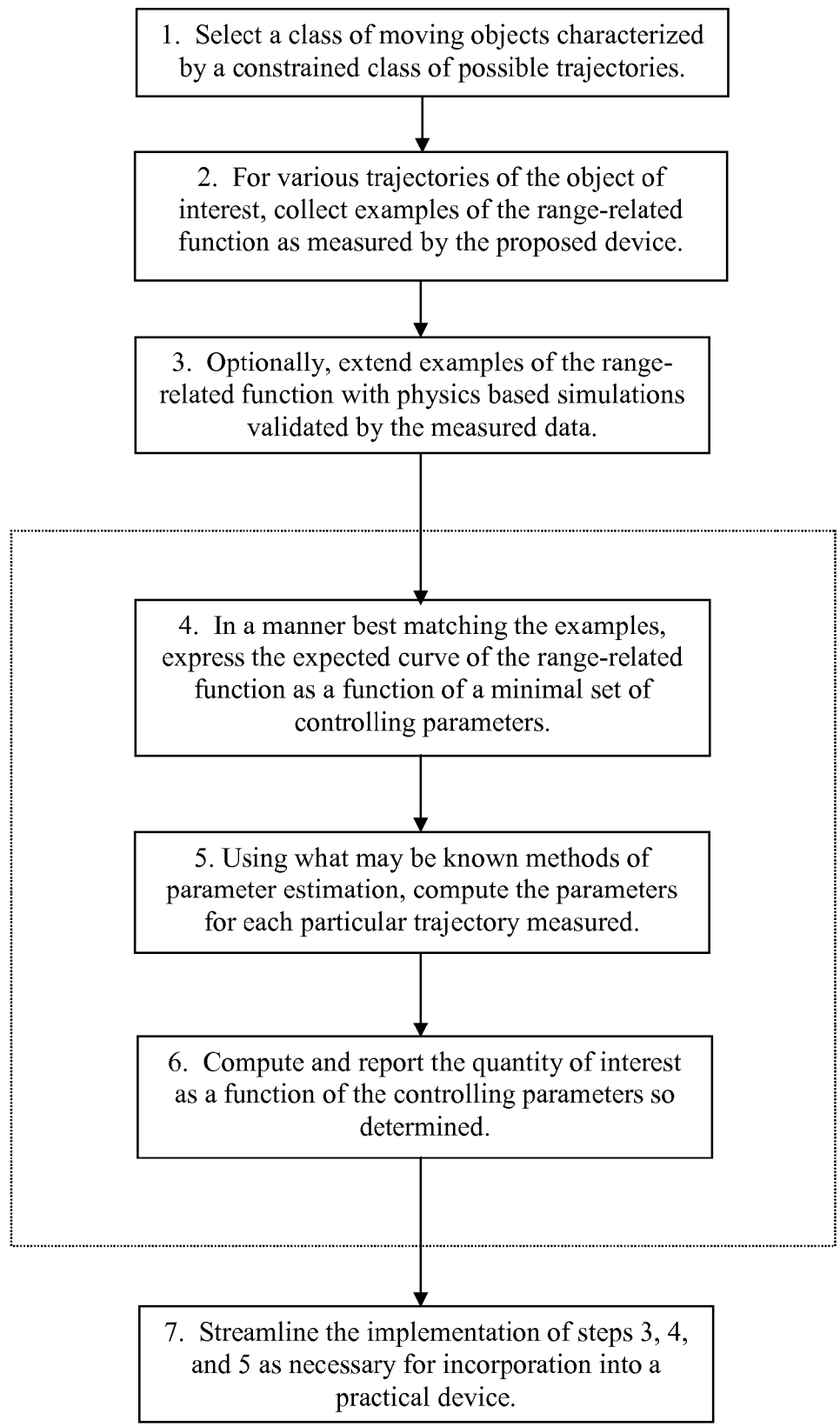
FIG. 23 is a flowchart depicting the method of the invention in overview.

FIG. 23 depicts an overall schema by which the method of the invention may be applied to the problem of using range-related data to measure a desired aspect of an object's motion. Specifically, the method of the invention may be generally applicable in the case where measured range-rates are incomplete, or do not directly represent the result required, but wherein the object motion may be expected to follow a path within a predictable class of trajectories. In addition to the flight of a ball, such predictable trajectories may include the roll of a ball over a surface of known contour, the motion of a Hockey puck on ice, or to the motion of a vehicle maintaining constant speed and direction.

The method of the invention may be noted to apply to situations where range-related data may be available from only a single measuring position. It may thus be constraints inherent to the form of possible trajectories that are exploited to achieve data-sufficiency. This may be contrasted with more elaborate solutions, wherein multiple channels of data from sufficiently separated measuring positions may be employed for triangulation.

Figure 24A:
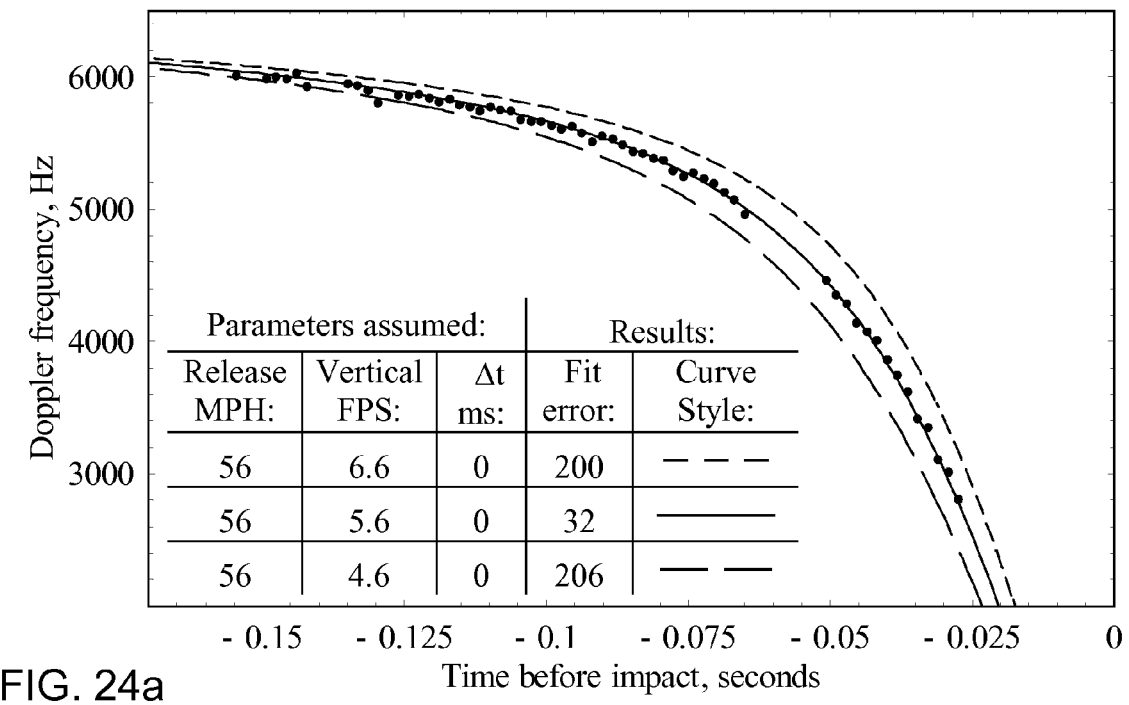
FIGS. 24a-24d further illustrate how the method of the invention provides improved speed accuracy when applied to actual data form a pitched baseball.
Figure 24B:
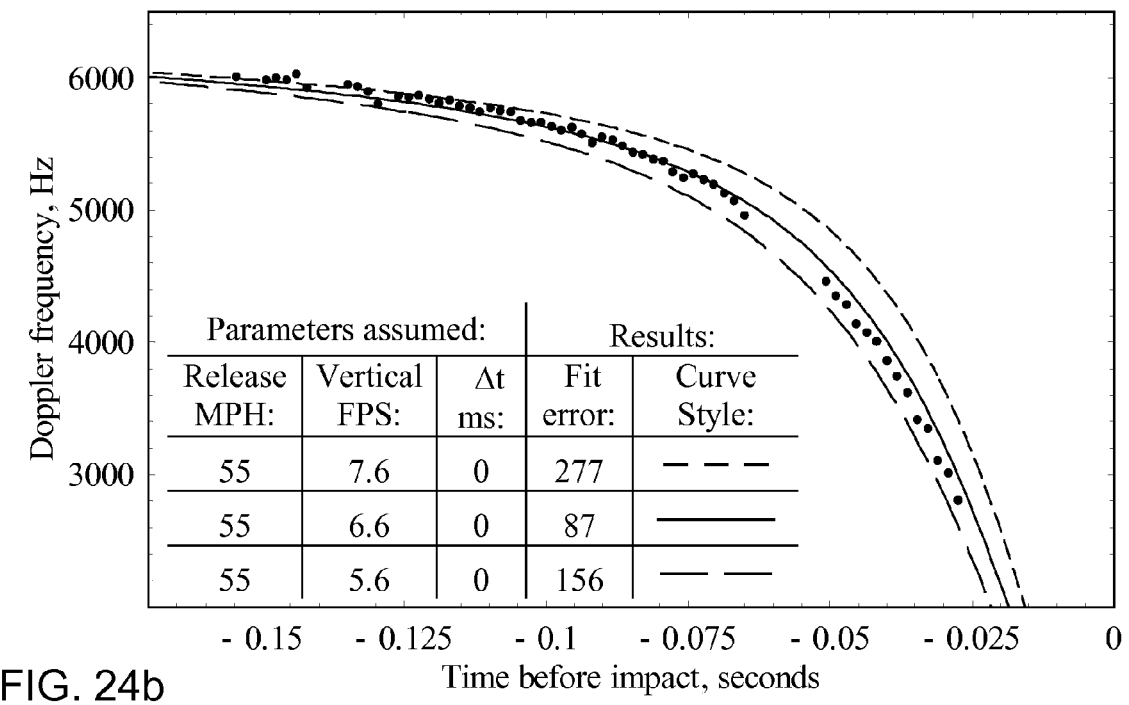
Figure 24C:
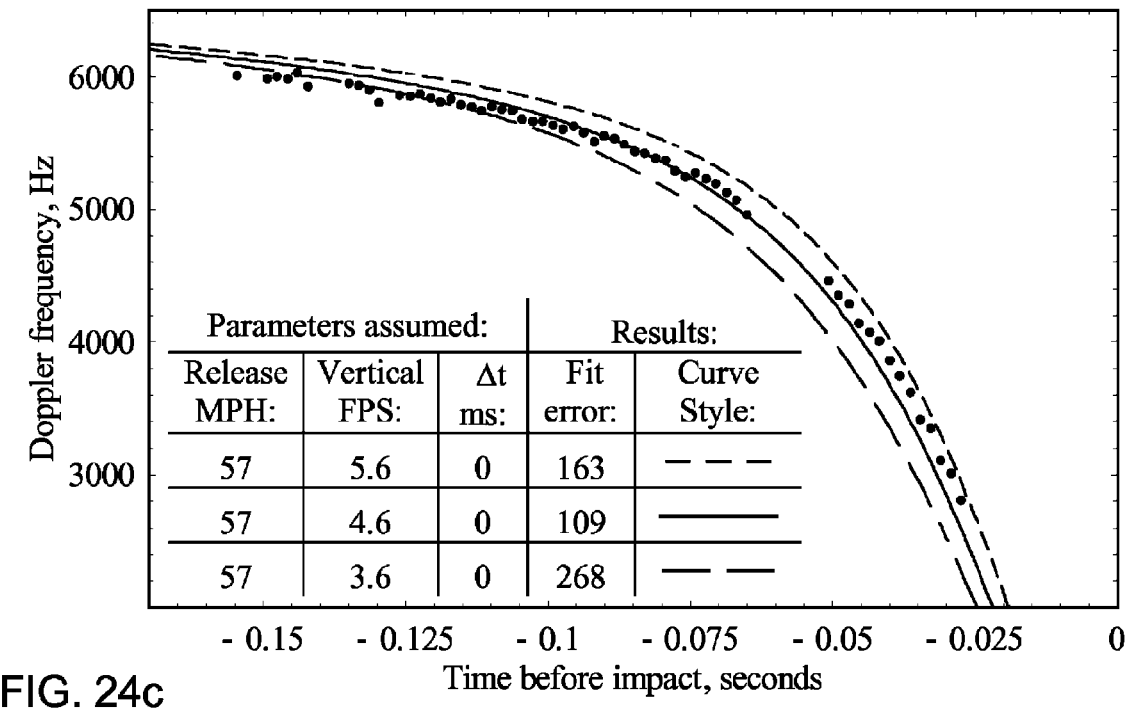
Figure 24D:
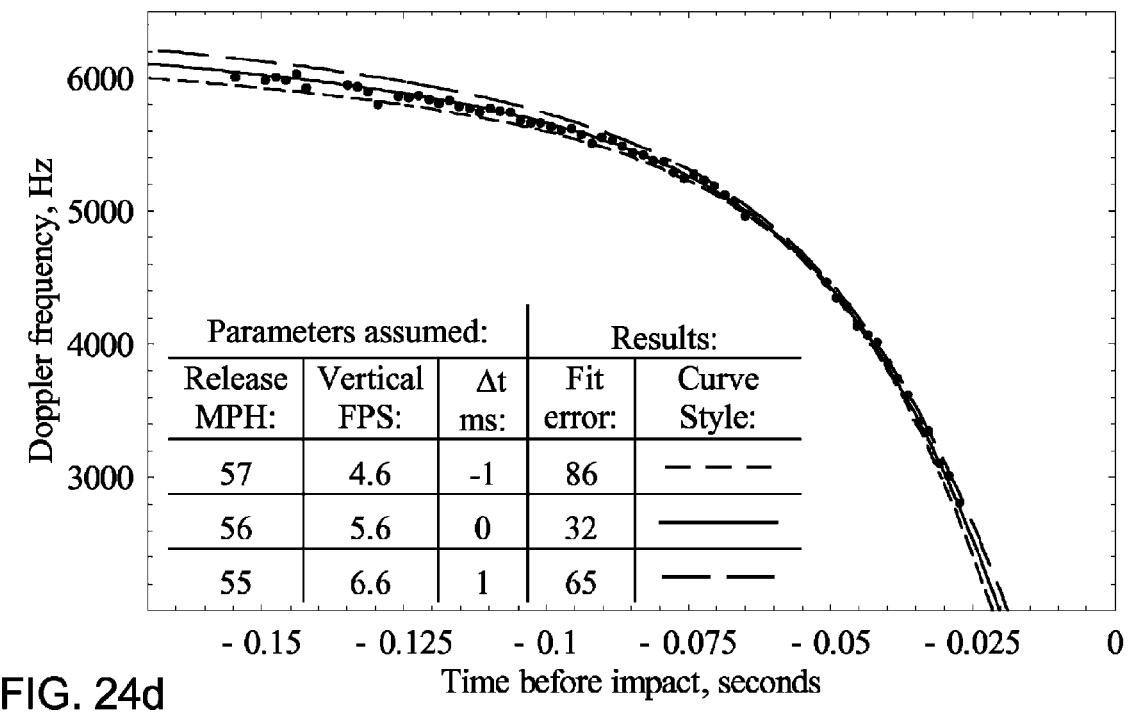

FIGS. 24a-24d further illustrate how limited data, collected in this case in accordance with the embodiment illustrated in FIGS. 1-10, may be exploited to single-out the most likely true trajectory. In addition to the measured data, these plots display the expected Doppler curves computed from differing assumptions of horizontal and vertical components of release speed. The curves have been chosen to show how the quality of fit varies in the vicinity of best-fit parameter values. FIGS. 24a, 24b, and 24c assume a known impact time, as in the application of the method of the invention to the embodiment illustrated in FIGS. 1-10. FIG. 24d reconsiders the fitting problem in the weaker case where impact time is not available, and the overall horizontal positioning of each curve must therefore be treated as a third independent parameter of the fit. While this illustrative fitting process has here been performed by hand-iteration of full simulations, it may be readily automated. In that form, it would correspond to the computationally intensive method described earlier, in which the second function may merely select the first parameter of the fit. In FIG. 24a, three computed trajectories are postulated for match to the actual data shown. All three presume a release speed of 56 MPH, but try values of the upward component at release varying by one foot per second. t=0 is in all three cases taken to occur at the measured moment of impact. Of these three, it is clear that the solid drawn curve stands out as the best fit. FIG. 24b is prepared in a like manner, but with all curves postulating a release speed of 55 MPH. It may be seen that finding the best-fit vertical component for this release-speed assumption provides a distinctly worse fit than possible for the 56 MPH case. With the best fit otherwise available, too slow a speed yields a curve that falls below the data at greater distances, and above the data at closer distances. In FIG. 24c, it may be seen that the converse situation applies to an assumed release speed that is too high. Thus, the fit parameters are constrained by the data to include a release speed known to a precision of better than 1 MPH.

In other applications of the method of the invention, an impact time on a target at a known location may not be available. Thus, there may not be a common time to which the data and possible Doppler curves may be referenced. Thus in the absence of a known impact time, the central curve of FIG. 24b might be shifted slightly to the left to represent a slightly earlier occurrence. This would be incompatible with the known impact time, but must be considered a possibility in this case. It may be seen that an appropriate small shift of this kind is expected to improve the quality of fit possible for the 55 MPH assumption, as errors at later times may be reduced this way by more that the errors at earlier times are increased. A similar argument applies to a small rightward shift of the central curve of FIG. 24c. It is found that for both cases, the minimum fit error is achievable by a shift magnitude of 1.0 millisecond. The resulting curves are plotted in FIG. 24d, along with the unadjusted best-fit for the 56 MPH assumption. It may be noted that the fit-error contrast still appears sufficient for speed determination at an accuracy level better than 1 MPH. But it may also be noted, that, as expected, the three parameter fit is not as distinct, and may be more sensitive to noise, than the two-parameter fit.

In particular, the method of the invention may be used with a three-parameter fit in application to a hand-held speed measuring device, or other speed measuring device not operated in conjunction with a target. A long-range device that it "picks up the pitch" immediately, for instance, may be used well to one side of the line-of-flight of a pitched ball. The method of the invention may then offer automatic cosine effect correction.

In further application of the method of the invention, extracted characteristics of a trajectory other than release speed may be used to advantage. Thus in the embodiment illustrated in FIGS. 1-10, the dopFar/dopNear ratio is greater as the ball strikes farther from the location of electronics module 102. For pitches in the strike zone, this is a useful proxy for how low or high the ball has hit. This information may, for instance, be useful in adding full game simulation to a pitching trainer embodiment. A simulated batter may employ random probabilities for achieving various kinds of hits. These may be adjusted in response to such factors as pitch speed, pitch speed variation, and height of pitch. In addition, extra information may be extracted from acoustic impact signal 1104. For instance, the lateHigherTotal/lateLowerTotal ratio, while exceeding strikeThreshold for just those pitches that are strikes, may still rise to particularly high values near the center of the strike zone. This information may also be used to increase the probability of a "hit".

It is noted that certain physical phenomena that may in principle affect accuracy are not discussed in detail herein, as both simulation and experience show little effect on the pitch release speeds reported by the embodiments of the invention. These phenomena may include the Magnus force achievable with the degree of spin that even a talented pitcher may apply to a pitch; a degree of wind that is compatible with pitches landing where aimed; and to impact points covering the backstop curtain left-to-right, as well as high-to-low. The latter issue arises in principle, only because the cosine effect may interact somewhat differently with the speed-of-descent effect when the pitch misses to the side.

What is claimed is:

1. An automated method for determining an estimate of a speed of a sports projectile at a time of interest, the method comprising:
   (A) measuring first data, the first data indicating a first range-rate value corresponding to a first time and comprising the time rate of change in the length of a first path, wherein the first path comprises a first line from an emitting means at a first fixed point to said sports projectile and a second line from said projectile to a sensing means at a second fixed point, wherein the first and second fixed points are fixed in relation to a target means provided for the sports projectile;
   (B) measuring second data, the second data indicating a second range-rate value corresponding to a second time and comprising the time rate of change in the length of a second path, wherein the second path comprises a third line from the emitting means at the first fixed point to said sports projectile and a fourth line from said projectile to the sensing means at the second fixed point, wherein the first time differs from the second time; and
   (C) estimating the speed of the sports projectile at the time of interest based on the first range-rate value, the first time, the second range-rate value, and the second time.

2. The method of claim 1, wherein (C) comprises estimating the speed of the sports projectile by extrapolating from the first data, the first time, the second data, and the second time, whereby the estimate falls outside the range of the first range-rate and the second range-rate.

3. The method of claim 1, wherein the time of interest comprises a time of release of the sports projectile by a person.

4. The method of claim 1, wherein said sports projectile is proximate to the target means at the first time.

5. The method of claim 1, further comprising:
   (D) measuring a relative time of impact of the sports projectile upon the target means; and
   wherein (C) comprises estimating the speed of the sports projectile at the time of interest based on the first range-rate value, the first time, the second range-rate value, the second time, and the relative time of impact.

6. The method of claim 1, wherein (C) comprises estimating the speed of the sports projectile along its line-of-intent at the time of interest based on the first range-rate value, the first time, the second range-rate value, the second time, and known characteristics of a restricted set of projectile trajectories.

7. The method of claim 6, wherein estimating comprises extrapolating outside the range of the first range-rate and the second range-rate.

8. The method of claim 6, wherein the time of interest is materially earlier than the first time.

9. The method of claim 6, wherein the path of the sports projectile at the first time makes a material angle with respect to a line connecting the sports projectile to the midpoint between the first fixed point and the second fixed point.

10. The method of claim 6, wherein said sports projectile is proximate to the target means at the first time.

11. An apparatus for determining an estimate of a speed of a sports projectile at a time of interest, the apparatus comprising:
   first measuring means for measuring first data, the first data indicating a first range-rate value corresponding to a first time and comprising the time rate of change in the length of a first path, wherein the first path comprises a first line from an emitting means at a first fixed point to said sports projectile and a second line from said projectile to a sensing means at a second fixed point, wherein the first and second fixed points are fixed in relation to a target means provided for the sports projectile;
   second measuring means for measuring second data, the second data indicating a second range-rate value corresponding to a second time and comprising the time rate of change in the length of a second path, wherein the second path comprises a third line from the emitting means at the first fixed point to said sports projectile and a fourth line from said projectile to the sensing means at the second fixed point, wherein the first time differs from the second time; and
   estimation means for estimating the speed of the sports projectile at the time of interest based on the first range-rate value, the first time, the second range-rate value, and the second time.

12. The apparatus of claim 11, further comprising:
   third measuring means for measuring a relative time of impact of the sports projectile upon the target means; and
   wherein the estimation means comprises means for estimating the speed of the sports projectile at the time of interest based on the first range-rate value, the first time, the second range-rate value, the second time, and the relative time of impact.

13. An automated method for determining an estimate of a speed of a sports projectile at a time of interest, the method comprising:
   (A) measuring, over an interval of time, a plurality of Doppler shifts of energy reflected from the sports projectile;
   (B) identifying a plurality of range rates for the sports projectile based on the plurality of Doppler shifts, wherein the plurality of range rates are, as a consequence of cosine error, less than the speed of the sports projectile during the interval of time, wherein the plurality of range rates have a plurality of cosine errors, wherein the plurality of cosine errors have a plurality of magnitudes that vary within the interval of time; and
   (C) using the variation among the plurality of magnitudes to extrapolate from the plurality of range rates to obtain a measure of speed of the sports projectile, corrected for cosine error.

14. The method of claim 13, wherein (C) comprises using differences in the plurality of range rate values to extrapolate from the plurality of range rates to obtain a measure of speed of the sports projectile, corrected for cosine error.

15. The method of claim 13, further comprising:
   (D) before (A), providing, from a point, a source of wave energy radiating toward the sports projectile.

16. An apparatus for determining an estimate of a speed of a sports projectile at a time of interest, the apparatus comprising:
   measurement means for measuring, over an interval of time, a plurality of Doppler shifts of energy reflected from the sports projectile;
   range-rate identification means for identifying a plurality of range rates for the sports projectile based on the plurality of Doppler shifts, wherein the plurality of range rates are, as a consequence of cosine error, less than the speed of the sports projectile during the interval of time, wherein the plurality of range rates have a plurality of cosine errors, wherein the plurality of cosine errors have a plurality of magnitudes that vary within the interval of time; and extrapolation means for using the variation among the plurality of magnitudes to extrapolate from the plurality of range rates to obtain a measure of speed of the sports projectile, corrected for cosine error.

17. The apparatus of claim 16, wherein the extrapolation means comprises means for using differences in the plurality of range rate values to extrapolate from the plurality of range rates to obtain a measure of speed of the sports projectile, corrected for cosine error.

18. The apparatus of claim 16, further comprising:
energy provision means for providing, from a point, a source of wave energy radiating toward the sports projectile.

* * * * *